US008573583B2

(12) United States Patent
Musha et al.

(10) Patent No.: US 8,573,583 B2
(45) Date of Patent: Nov. 5, 2013

(54) BOOKLET CONVEYING DEVICE, IMAGE FORMING SYSTEM, AND BOOKLET CONVEYING METHOD

(75) Inventors: Akihiro Musha, Kanagawa (JP); Nobuyoshi Suzuki, Tokyo (JP); Kiyoshi Hata, Tokyo (JP); Kei Sasaki, Miyagi (JP); Makoto Hidaka, Tokyo (JP); Takashi Saito, Kanagawa (JP); Takamasa Matsumoto, Miyagi (JP); Shingo Matsushita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/531,846

(22) Filed: Jun. 25, 2012

(65) Prior Publication Data

US 2013/0011219 A1 Jan. 10, 2013

(30) Foreign Application Priority Data

Jul. 7, 2011 (JP) ................................ 2011-151222

(51) Int. Cl.
*B65G 15/00* (2006.01)

(52) U.S. Cl.
USPC .... 270/58.17; 270/45; 270/58.07; 270/58.12; 270/58.27; 412/16; 198/620; 198/626.3

(58) Field of Classification Search
USPC ......... 270/37, 45, 58.07, 58.12, 58.17, 58.27; 412/16; 198/620, 626.3
See application file for complete search history.

(56) References Cited

U.S. PATENT DOCUMENTS

| | | | | |
|---|---|---|---|---|
| 7,431,274 | B2 * | 10/2008 | Kushida et al. | 270/37 |
| 8,459,629 | B2 * | 6/2013 | Abe | 270/45 |
| 2009/0258774 | A1 | 10/2009 | Suzuki et al. | |
| 2010/0148417 | A1 | 6/2010 | Suzuki et al. | |
| 2010/0239393 | A1 | 9/2010 | Suzuki et al. | |
| 2010/0303585 | A1 | 12/2010 | Asami et al. | |
| 2010/0310340 | A1 | 12/2010 | Suzuki et al. | |
| 2011/0103863 | A1 | 5/2011 | Asami et al. | |
| 2011/0103921 | A1 | 5/2011 | Suzuki et al. | |
| 2011/0140335 | A1 * | 6/2011 | Abe | 270/4 |
| 2011/0229287 | A1 | 9/2011 | Suzuki | |
| 2012/0087765 | A1 | 4/2012 | Suzuki | |
| 2013/0001849 | A1 * | 1/2013 | Suzuki et al. | 270/58.27 |

FOREIGN PATENT DOCUMENTS

| | | |
|---|---|---|
| JP | 2004-196494 A | 7/2004 |
| JP | 2010-173004 A | 8/2010 |

* cited by examiner

*Primary Examiner* — Leslie A Nicholson, III
(74) *Attorney, Agent, or Firm* — Harness, Dickey & Pierce, P.L.C.

(57) ABSTRACT

In an embodiment, a booklet conveying device includes: a pair of conveying units; a positioning unit; a pressing unit; and a conveying-force changing unit. The pair of conveying units convey a booklet made of a stack of folded sheets, and change a distance therebetween. The positioning unit positions the booklet by making a leading-end portion of the booklet abut thereto. The pressing unit presses the booklet positioned by the positioning unit onto one of the conveying units in order to fix. The conveying-force changing unit changes the conveying force exerted by the conveying units.

10 Claims, 16 Drawing Sheets

BOOKLET CONVEYING DEVICE, IMAGE FORMING SYSTEM, AND BOOKLET CONVEYING METHOD

CROSS-REFERENCE TO RELATED APPLICATIONS

The present application claims priority to and incorporates by reference the entire contents of Japanese Patent Application No. 2011-151222 filed in Japan on Jul. 7, 2011.

BACKGROUND OF THE INVENTION

1. Field of the Invention

The embodiments relate to booklet conveying devices, image forming systems, and booklet conveying methods. More particularly, the invention relates to a booklet conveying device that conveys a booklet formed by folding sheets of a recording medium (hereinafter, abbreviated to "sheets") such as ordinary paper, recording paper, or transfer paper, an image forming system including the booklet conveying device, and a booklet conveying method to be performed by the booklet conveying device.

2. Description of the Related Art

Sheet processing apparatuses arranged downstream of an image forming apparatus body to perform postprocessing, such as stapling, on recording sheets or the like output from the image forming apparatus are widely known. Such sheet processing apparatuses have come to incorporate multiple functions recently. Sheet processing apparatuses capable of making booklets by not only side stitching but also by saddle stitching have also become common. Some type of such sheet processing apparatuses that make booklets by saddle stitching further trims an edge(s) of a stapled booklet using a trimmer to increase quality of the finished products.

In such a trimmer, a booklet to be trimmed is typically conveyed by a conveying unit such as a belt and positioned by being abutted against an abutting stopper that is located at a position appropriate for a size of the booklet, a trim size, and/or the like. Thereafter, a trimming unit trims an edge of the booklet that is fixed by being pressed by a pressing unit. As a result, the stapled booklet has a flush finished edge.

However, in the conventional trimmer, the conveying unit such as a belt rotates in a state where the booklet is in contact with the positioning stopper, causing a surface sheet of the booklet to be swelled out. When the booklet is fixed in this state and trimmed, the edge of the trimmed booklet becomes uneven. Furthermore, when the pressing unit presses the booklet in a manner that the pressing unit flattens the swelling of the booklet, flexure develops on a surface side or a spine side of the booklet during the pressing, resulting in that the booklet is moved forward or backward and pressed in a misaligned state. Accordingly, trimming the booklet in such a pressed state can undesirably make the edge of the trimmed booklet uneven.

An example of devices that perform trimming without developing such flexure is disclosed in Japanese Patent Application Laid-open No. 2004-196494. In this device, a pressing force is gradually applied from a spine side (e.g., an end portion on a folded side) of the sheets using a plate, a roller, or the like to a folded sheet stack in a manner to move the sheets toward their end surfaces before the sheets are fixed by being pressed by a stack pressing member, thereby preventing flexure between a position where the sheet stack is pressed and the spine side of the sheets.

Hereinafter, "pressing" means generating a pressure by pressing something; "pressing force" is a pressure generated by pressing, or, put another way, a force exerted to press something. "When being pressed" refers to a situation where an operation of pressing a subject is performed, or, put another way, when the subject is pressed. "Abutting" means that something comes into contact with an object and this abutted (contact) condition is maintained.

Disclosed in Japanese Patent Application Laid-open No. 2004-196494 is a technique for correcting flexure and/or misalignment of the booklet before the booklet is pressed. This technique makes it possible to rectify flexure and/or misalignment of the booklet. This technique also prevents development of flexure in a booklet when the booklet is pressed, and is presumably effective in rectifying flexure in the booklet. However, the booklet can move toward its end surface when a pressing force is applied to the booklet. Trimming the booklet in the moved state can undesirably cause the booklet to have a slanted trimmed face.

The reason why the booklet moves toward its end surface is described more specifically in greater depth below. FIGS. 20 and 21 are schematic explanatory diagrams illustrating a disadvantage pertaining to the conventional technique. FIG. 20 illustrates an example where a booklet BT is pressed by a guide member 321 which is on a top side. Referring to FIG. 20, in this example, the guide member 321 arranged in an upper portion of a booklet conveying unit presses the booklet BT toward a first conveying belt 310 arranged in a lower portion of the booklet conveying unit so that the first conveying belt 310 conveys the booklet BT.

In this configuration, a conveying pressure is applied to the booklet BT by lowering the guide member 321. However, a frictional force between the first conveying belt 310 and the booklet BT is greater than a friction force between the guide member 321 and the booklet BT (if the former is not greater than the latter, conveyance cannot be performed). Accordingly, when alignment is performed by conveying the booklet BT into abutment on a positioning stopper 317, the first conveying belt 310 rotates even after the booklet BT has abutted on the positioning stopper 317. As a result, a torque is generated in a direction indicated by arrow D11, causing an upper side of the booklet BT to move relative to a lower side of the booklet BT as indicated by arrow D12. Consequently, the fore edge portion of the booklet BT becomes uneven. After the booklet BT is positioned, misalignment of the booklet BT similar to that that occurs during the alignment of the booklet BT can also occur when the booklet is fixed by being pressed in a situation where coefficients of friction of the guide member 321 and the first conveying belt 310, which are guide members on the top side and the bottom side of the booklet BT, differ from each other.

After the booklet BT is positioned by being abutted to the positioning stopper 317, misalignment of the booklet BT similar to that that occurs during the alignment of the booklet BT can also occur when the guide member 321 is lowered to fix the booklet BT in a situation where coefficients of friction between upper and lower members which are brought into contact with the booklet BT differ from each other.

FIG. 21 illustrates an example where the booklet BT is pressed by a second conveying belt 312, which is on the top side. Referring to FIG. 21, in this example, the second conveying belt 312 arranged in the upper portion of the booklet conveying unit is moved toward the first conveying belt 310 arranged in the lower portion of the booklet conveying unit so that the first and second conveying belts 310 and 312 convey the booklet BT sandwiched therebetween.

When such a configuration as described above is employed, the first and second conveying belts 310 and 312 rotate in a state where the booklet BT abuts on the positioning stopper 317 while alignment is performed by causing the booklet BT to abut on the positioning stopper 317. Accordingly, a conveying force acts on a surface sheet of the booklet BT, thereby undesirably developing flexure BT10 near a spine of the booklet BT. After trimming of the booklet BT fixed in this state, the flexure of the surface sheet is straightened. Accordingly, the finished booklet BT undesirably has an uneven fore edge portion.

There is a need of a booklet pressing device that fixes a booklet by pressing the booklet without causing a surface sheet to be misaligned.

SUMMARY OF THE INVENTION

It is an object of the present invention to at least partially solve the problems in the conventional technology.

According to an embodiment, a booklet conveying device includes: a pair of conveying units; a positioning unit; a pressing unit; and a conveying-force changing unit. The pair of conveying units convey a booklet made of a stack of folded sheets, and change a distance therebetween. The positioning unit positions the booklet by making a leading-end portion of the booklet abut thereto. The pressing unit presses the booklet positioned by the positioning unit onto one of the conveying units in order to fix. The conveying-force changing unit changes the conveying force exerted by the conveying units.

According to another embodiment, a booklet conveying method for a booklet conveying device includes: conveying a booklet made of a stack of folded sheets by a pair of conveying units that change a distance therebetween; positioning the booklet by making a leading-end portion of the booklet abut thereto by a positioning unit; pressing the booklet positioned by the positioning unit onto one of the conveying units in order to fix by a pressing unit; and changing, by a conveying-force changing unit, the conveying force exerted by the conveying units during at the conveying and pressing.

According to still another embodiment, a computer program product comprises a non-transitory computer-usable medium having computer-readable program codes embodied in the medium for a booklet conveying device. The program codes when executed causes a computer to execute the method mentioned above.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A booklet conveying device according to an embodiment is capable of conveying a booklet reliably by preventing development of flexure in a surface sheet of the booklet during stopping and fixing the booklet being conveyed. This is achieved by decreasing a frictional force (resistance force)

between the surface sheet and a surface that comes into contact with the surface sheet when the booklet is fixed by being pressed, while increasing the frictional force (conveying force) between the booklet and a conveying unit when the booklet is conveyed.

Figure 21:
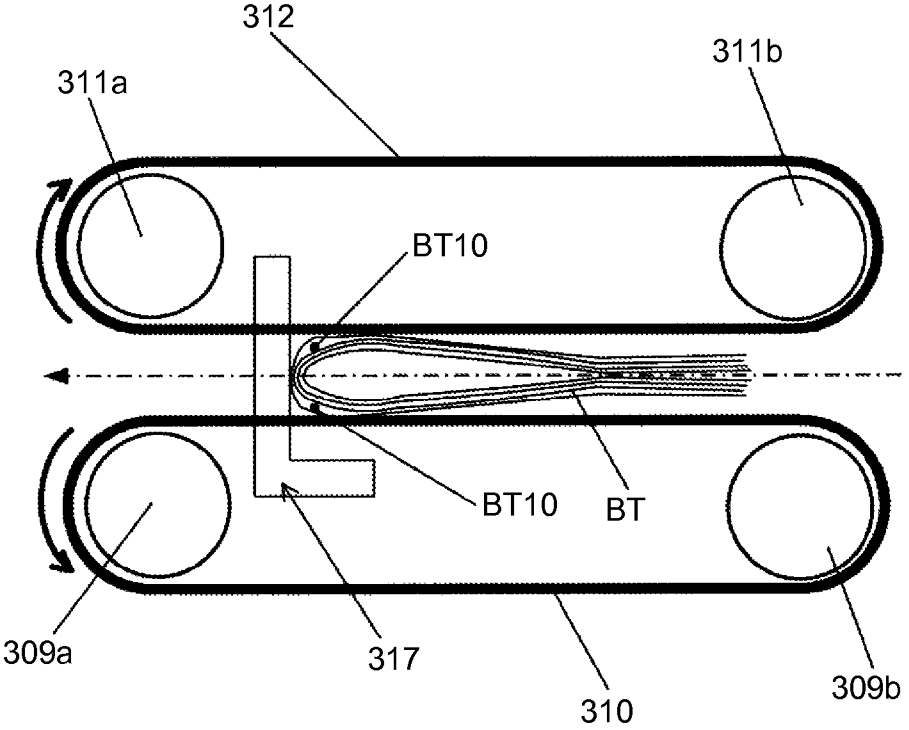
FIG. 21 is an explanatory diagram of a disadvantage of a conventional technique, illustrating an example where the booklet is pressed by a conveying belt on the top side.
Figure 22A:
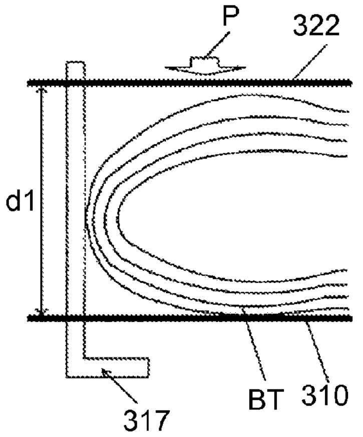
FIGS. 22A to 22E are explanatory diagrams of a principle of the embodiment, illustrating a conveying guide, a positioning stopper, and sheets of the booklet that is being fixed by pressure.
Figure 22B:
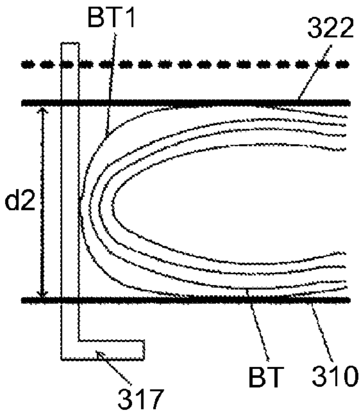
Figure 22C:
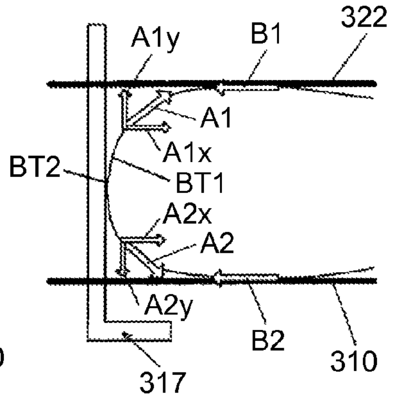

FIGS. 22A to 22E are explanatory diagrams of a principle of the embodiment, illustrating a conveying guide, a positioning stopper, and sheets in a booklet that is being fixed by pressure. The booklet BT is conveyed as illustrated in FIG. 21. A conveying guide (this member is referred to as a conveying guide because this member is not limited to a conveying belt) 322 on the top side descends from a position where a distance between the conveying guide 322 and the first conveying belt 310 on the bottom side is a first distance d1 for sheet carry-in as illustrated in FIG. 22A to a position where the distance is a second distance d2, which is an alignment distance for alignment of the booklet BT, to narrow the distance between the conveying guide 322 and the first conveying belt 310 on the bottom side, thereby pressing the booklet BT. As a result, such a force as illustrated in FIG. 22C acts on a surface sheet BT11 of the booklet BT.

In other words, a pressing force P corresponding to a reaction force in the booklet BT is applied to the booklet BT when the conveying guide 322 descends to a position where the conveying guide 322 is away from the first conveying belt 310 the predetermined alignment distance, which is the second distance d2 in this example. This pressing force P is the reaction force in the booklet BT and therefore varies depending on a folding height of the booklet BT.

This pressing force develops a static frictional force F in a leading-end portion BT2 of the booklet BT in a direction opposite to the pressing direction. The static frictional force F is expressed by the following equation, in which μ3 is a coefficient of static friction between the positioning stopper 317 and a surface sheet BT1, and P1 is a pressure in a condition where the sheet BT abuts on the positioning stopper 317.

$$F=\mu 3\cdot P1$$

As the distance between the conveying guide 322 and the first conveying belt 310 decreases, the pressing force P increases, and horizontal components of forces impelling the surface sheet BT1 back toward the fore edge also increase. This means that as the distance decreases, a force impelling the surface sheet BT1 of the booklet BT back toward the fore edge increases. Meanwhile, the static frictional force F that develops in a contact portion between the leading-end portion BT2 of the surface sheet BT1 and the positioning stopper 317 depends on magnitudes of vectors along the sheet surface from the contact portion. The magnitudes of vectors A1 and A2 appear as a strength of resilience of the sheet BT1.

A static frictional force B1 and a static frictional force B2 develop between the surface sheet BT1 and the conveying guide 322 and between the surface sheet BT1 and the first conveying belt 310, respectively, in a direction opposite to the direction, in which the surface sheet BT1 is impelled back toward the fore edge. The static frictional forces B1 and B2 are expressed by the following expressions, in which μ1 is a coefficient of static friction between the surface sheet BT1 and the conveying guide 322, and μ2 is a coefficient of static friction between the surface sheet BT1 and the first conveying belt 310.

$$B1=\mu 1\cdot P$$

$$B2=\mu 2\cdot P$$

Accordingly, there can be a case where the static frictional force F1 and the horizontal components of the static frictional forces B1 and B2 act to develop flexure BT3 between the surface sheet BT1 and a sheet BT4 that is on an inner side relative to the sheet BT1.

Figure 22D:
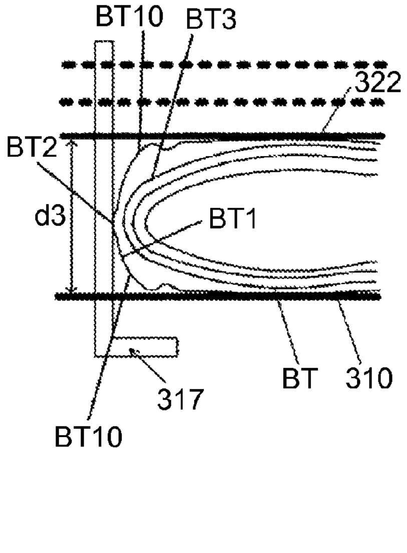

More specifically, when the following relationship exists (i.e., the resistance force on a side of the guide member is greater than the vector A1 in magnitude) in a state where the booklet BT is further finally pressed from the state illustrated in FIG. 22C to a position (the position where a third distance d3 is attained) illustrated in FIG. 22D and fixed, a coefficient of static friction between the inner sheet BT4 and the surface sheet BT1 is small.

$$A1x<B1$$

In this case, only the surface sheet BT1 has flexure. When the booklet BT is trimmed in such a state where only the surface sheet BT1 has flexure, the fore edge portion of the booklet BT is to have misalignment of sheets because flexure of the surface sheet BT11 is straightened after trimming.

However, in the embodiment, the static frictional force between the surface sheet BT1 and the conveying guide 322 is decreased so that the following relationship holds.

$$A1x>B1$$

This causes the surface sheet BT1 to skid on the conveying guide 322, thereby preventing development of the flexure BT3.

Figure 22E:
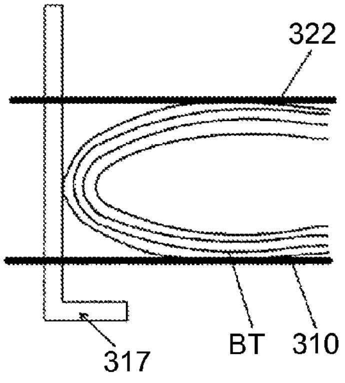

FIG. 22E is a diagram illustrating the booklet BT in a state where both the static frictional force between the conveying guide 322 and the surface sheet BT1 and the static frictional force between the first conveying belt 310 and the surface sheet BT1 are set to be smaller than the static frictional force between the positioning stopper 317 and the surface sheet BT1. Even when the distance is reduced to the distance d3, the fore edge is aligned because no flexure develops in the surface sheet BT1. Accordingly, the booklet BT does not have an uneven fore edge portion after trimming.

In this example, both μ1 and μ2 are decreased; however, setting the coefficient of static friction μ2 (or the static frictional force) of the conveying guide 322 on the top side to be smaller than the coefficient of static friction μ2 of the first conveying belt 310 on the bottom side is more effective in preventing flexure. This is because upper sheets in the booklet BT have smaller contact areas between adjacent sheets because the upper sheets are under smaller loads than lower sheets in the booklet BT are and therefore the frictional force between the inner sheet BT3 and the surface sheet BT1 becomes smaller than that of lower ones.

The sheet becomes more likely to skid while the booklet BT is fixed by being pressed when the coefficient of static friction between a surface of the conveying guide 322 where the conveying guide 322 contacts the surface sheet BT1 of the booklet BT and the surface sheet BT11 is lowered as described above. Accordingly, when the booklet BT is pressed, the surface sheet BT1 is skid to be aligned with a to-be-trimmed side by resilience of the surface sheet BT1, and a trimmed face on the fore edge of the booklet BT becomes more likely to be aligned. However, the conveying force for conveying the booklet BT decreases when the coefficient of static friction between the conveying guide 322 and the surface sheet BT1 is lowered. To take this into consideration, a conveying-force changing unit that can increase the conveying force in magnitude only during conveyance is employed in the present embodiment. A CPU 351 is used as the conveying-force changing unit.

Exemplary embodiments are described below with reference to the accompanying drawings. Similar constituents are denoted by like reference numerals and symbols in the description below, and repeated descriptions are omitted as appropriate.

Figure 1:
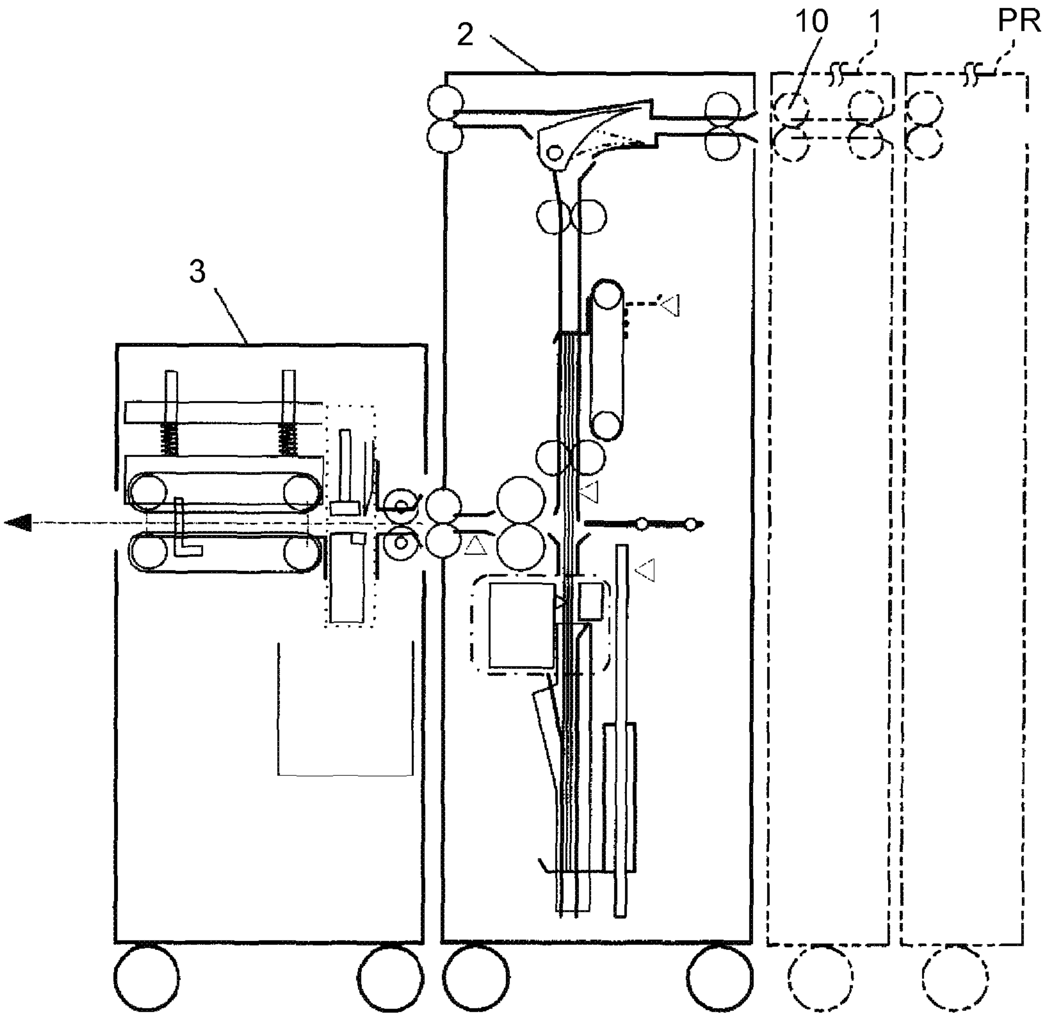
FIG. 1 is a diagram illustrating a system configuration of an image forming system including an image forming apparatus and a plurality of sheet processing apparatuses according to an embodiment.

FIG. 1 is a diagram illustrating a system configuration of an image processing system that includes an image forming apparatus and a plurality of sheet processing apparatuses according to an embodiment In this embodiment, first to third sheet postprocessing apparatuses 1, 2, and 3 are connected to and arranged downstream of an image forming apparatus PR in this order.

The first sheet postprocessing apparatus 1 is a sheet postprocessing apparatus that has a sheet-stack producing function of receiving sheets from the image forming apparatus PR one sheet by one sheet, stacking and aligning the sheets, and producing a sheet stack in a stacking unit. The first sheet postprocessing apparatus 1 discharges the sheet stack to the second sheet processing apparatus 2 downstream using sheet-stack discharging rollers 10. The second sheet postprocessing apparatus 2 is a saddle-stitch booklet-making apparatus that receives the sheet stack conveyed to the apparatus 2 and performs center folding and saddle stitching on the sheet stack. In this document, the second sheet postprocessing apparatus is sometimes referred to as the saddle-stitch booklet-making apparatus.

The saddle-stitch booklet-making apparatus 2 discharges the produced booklet to the third sheet processing apparatus 3. The third sheet processing apparatus 3 is a trimmer that trims a fore edge of sheets conveyed into the trimmer. The third sheet postprocessing apparatus is sometimes referred to as the trimmer below. The booklet trimmed by the trimmer 3 is discharged as-is to the outside of the trimmer and loaded on a discharge tray (not shown). When another sheet processing apparatus is connected downstream to the trimmer 3, the booklet is discharged as-is into this sheet processing apparatus. The image forming apparatus PR forms a visible image on a sheet-like recording medium based on image data that is input to the image forming apparatus PR or obtained by scanning. The image forming apparatus PR corresponds to, for instance, a copying machine, a printing machine, a facsimile machine, or a multifunction periphery having at least two functions of these machines.

Figure 2:
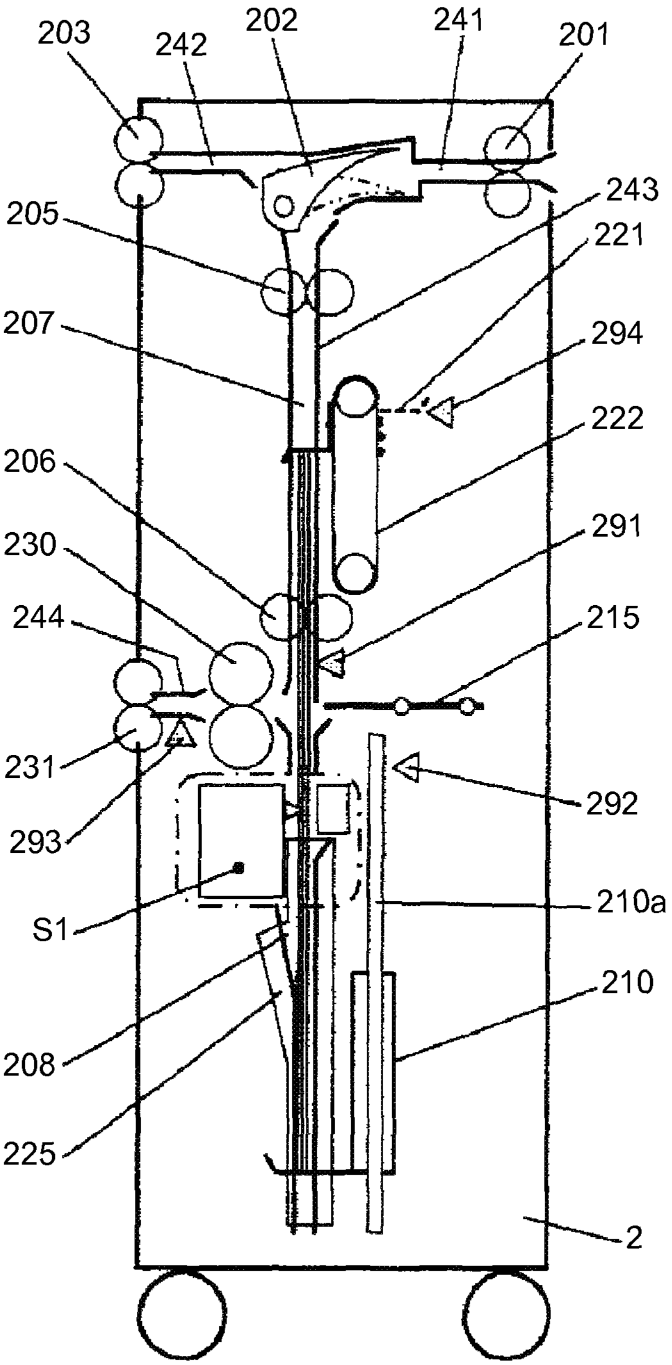
FIG. 2 is a diagram illustrating in detail the configuration of a second sheet postprocessing apparatus (saddle-stitch booklet-making apparatus), which is one of the sheet processing apparatuses illustrated in FIG. 1.

FIG. 2 is a diagram illustrating in detail the configuration of the saddle-stitch booklet-making apparatus 2 illustrated in FIG. 1. The saddle-stitch booklet-making apparatus 2 includes an entrance conveying path 241, a nonprocessing sheet conveying path 242, and a center-folding conveying path 243. Entrance rollers 201 are arranged most upstream of the entrance conveying path 241 in a sheet conveying direction to carry in the aligned sheet stack from the image forming apparatus 1 through the sheet-stack discharging rollers 10 into the saddle-stitch booklet-making apparatus 2. In the description below, upstream in the sheet conveying direction is abbreviated as upstream, and downstream in the sheet conveying direction is abbreviated as downstream.

A bifurcating claw 202 is arranged downstream of the entrance rollers 201 on the entrance conveying path 241. The bifurcating claw 202 is situated to lie horizontally in FIG. 2. The bifurcating claw 202 causes the sheet stack to be conveyed to either the nonprocessing sheet conveying path 242 or the center-folding conveying path 243. The nonprocessing sheet conveying path 242 is a conveying path that extends horizontally from the entrance conveying path 241 to guide a sheet stack to either the downstream processing apparatus (not shown) or the discharge tray. The sheet stack is discharged downstream by upper discharging rollers 203. The center-folding conveying path 243 is a conveying path that extends vertically downward from the bifurcating claw 202 so that saddle stitching and center folding is performed on a sheet stack.

The center-folding conveying path 243 includes an upper stack-conveying guide plate 207 that guides a sheet stack at a position above a folding plate 215 for use in center folding and a lower stack-conveying guide plate 208 that guides the sheet stack at a position below the folding plate 215. Arranged on the stack-conveying guide plate 207 are upper stack-conveying rollers 205, a trailing-end tapping claw 221, and lower stack-conveying rollers 206 in this order from a higher portion to a lower portion. The trailing-end tapping claw 221 stands perpendicularly on a trailing-end-tapping-claw driving belt 222 that is driven by a driving motor (not shown). The trailing-end tapping claw 221 is moved by a reciprocating rotary motion of the driving belt 222 to tap (press) a trailing end of the sheet stack toward a movable fence, which will be described later, thereby aligning the sheet stack. The trailing-end tapping claw 221 retreats from the center-folding conveying path 243 at the upper stack-conveying guide plate 207 (to a position indicated by dashed lines in FIG. 2) when a sheet stack is conveyed into the apparatus or when a sheet stack is elevated for center folding.

Reference numeral 294 denotes a trailing-end-tapping-claw HP sensor that detects a home position of the trailing-end tapping claw 221 to which the trailing-end tapping claw 221 retreats from the center-folding conveying path 243. The home position is indicated by the dashed lines in FIG. 2. The trailing-end tapping claw 221 is controlled with reference to this home position.

Arranged on the lower stack-conveying guide plate 208 are a saddle-stitch stapler S1, a pair of saddle-stitch jogger fences 225, and a movable fence 210 in this order from highest to lowest. The lower stack-conveying guide plate 208 is a guide plate that receives the sheet stack conveyed along the upper stack-conveying guide plate 207. The pair of saddle-stitch jogger fences 225 is arranged to sandwich the lower stack-conveying guide plate 208 therebetween in the width direction. The movable fence 210 on which the leading end of the sheet stack is to abut (to be supported) is arranged at a lower portion of the lower stack-conveying guide plate 208 to be vertically movable.

The saddle-stitch stapler S1 is a stapler that saddle stitches a sheet stack at its center portion. The movable fence 210 moves upward or downward while supporting the leading end of the sheet stack to thereby position the sheet stack at a location where the center of the sheet stack faces the saddle-stitch stapler S1. At this location, the sheet stack is stapled, i.e., saddle stitched. The movable fence 210 is supported by a movable-fence driving mechanism 210*a* and movable from a position of a movable-fence HP sensor 292, which corresponds to an upper position in FIG. 5, to a lowermost position. A movable range of the movable fence on which the leading end of the sheet stack is to abut provides a stroke that allows processing of sheet stacks of various sizes from a maximum processable size to a minimum processable size of the saddle-stitch booklet-making apparatus 2. A rack-and-pinion mechanism can be used as the movable-fence driving mechanism 210*a*, for instance.

The folding plate 215, a pair of folding rollers 230, a discharging conveying path 244, and lower discharging rollers 231 are provided between the upper stack-conveying guide plate 207 and the lower stack-conveying guide plate 208, i.e., at a substantially center portion of the center-folding conveying path 243. The folding plate 215 is capable of reciprocating in the horizontal direction in FIG. 2. A nip between the pair of folding rollers 230 is at a position toward which the folding plate 215 moves during a folding operation. The discharging conveying path 244 is arranged at a position away from the folding plate 215 than the nip is in a direction in which the folding plate 215 reciprocates. The lower discharging rollers 231 are arranged most downstream of the discharging conveying path 244 to discharge folded sheets stack downstream.

A sheet-stack detection sensor 291 is arranged at a lower end portion of the upper stack-conveying guide plate 207 to detect the leading end of the sheet stack conveyed into the center-folding conveying path 243 and passing through the center-folding position. A crease passage sensor 293 is arranged on the discharging conveying path 224 to detect the leading end of the center-folded sheet stack. When the leading end is detected, it is determined that the sheet stack has passed.

The saddle-stitch booklet-making apparatus 2 which is configured as illustrated in FIG. 2 performs saddle stitching and center folding operations as roughly illustrated in explanatory operation diagrams depicted in FIGS. 3 to 7. More specifically, when saddle stitching and center folding are selected from an operation panel PN (see FIG. 15) of the image forming apparatus 1, a sheet stack for which saddle stitching and center folding are selected is guided to the center-folding conveying path 243 by counterclockwise biasing motion of the bifurcating claw 202. The bifurcating claw 202 is driven by a solenoid. The bifurcating claw 202 may alternatively be motor-driven.

Figure 3:
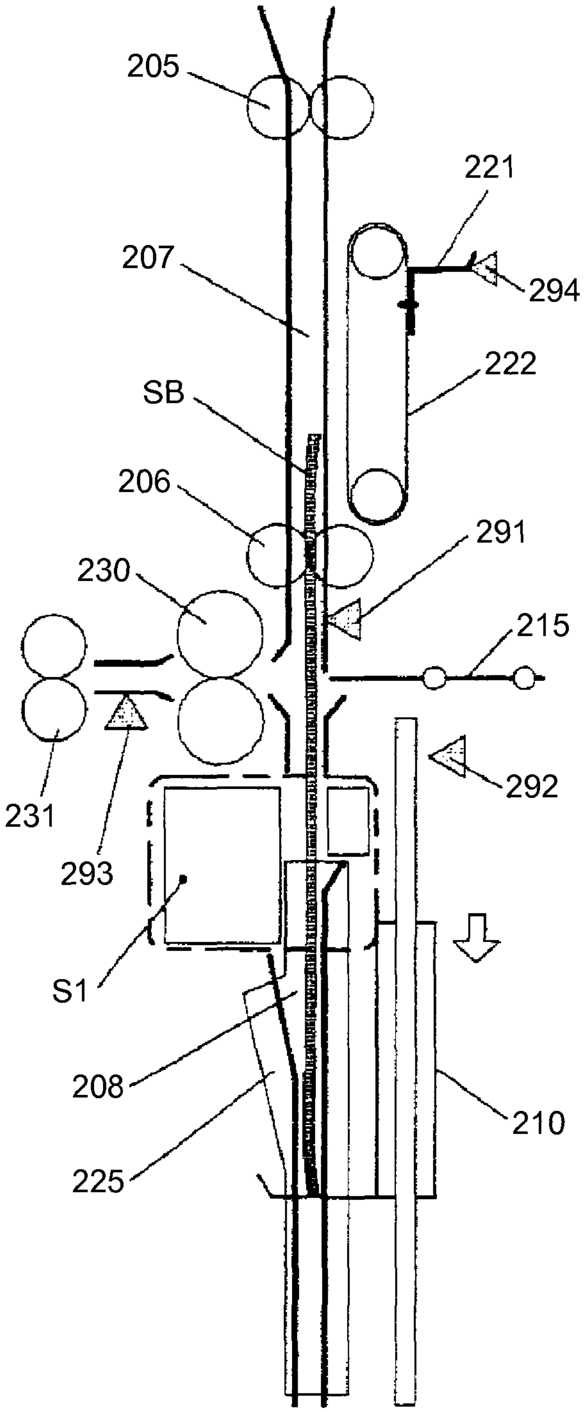
FIG. 3 is an explanatory diagram of operations to be performed by the saddle-stitch booklet-making apparatus, illustrating a state where a sheet stack is conveyed into the apparatus.

A sheet stack SB conveyed into the center-folding conveying path 243 is conveyed downstream along the center-folding conveying path 243 by the entrance rollers 201 and the upper stack-conveying rollers 205. After passage of the sheet stack SB is detected by the sheet-stack detection sensor 291, the sheet stack SB is conveyed by the lower stack-conveying rollers 206 to a position where a leading end of the sheet stack SB abuts on the movable fence 210 as illustrated in FIG. 3. The movable fence 210 is on standby for this abutting at a stop position that varies depending on sheet size information fed from the image forming apparatus 1. In this example, the sheet size information is information about the size of the sheet stack SB in the conveying direction. FIG. 3 illustrates a state at this time where the lower stack-conveying rollers 206 hold the sheet stack SB between its nip, and the trailing-end tapping claw 221 is on standby at its home position.

Figure 4:
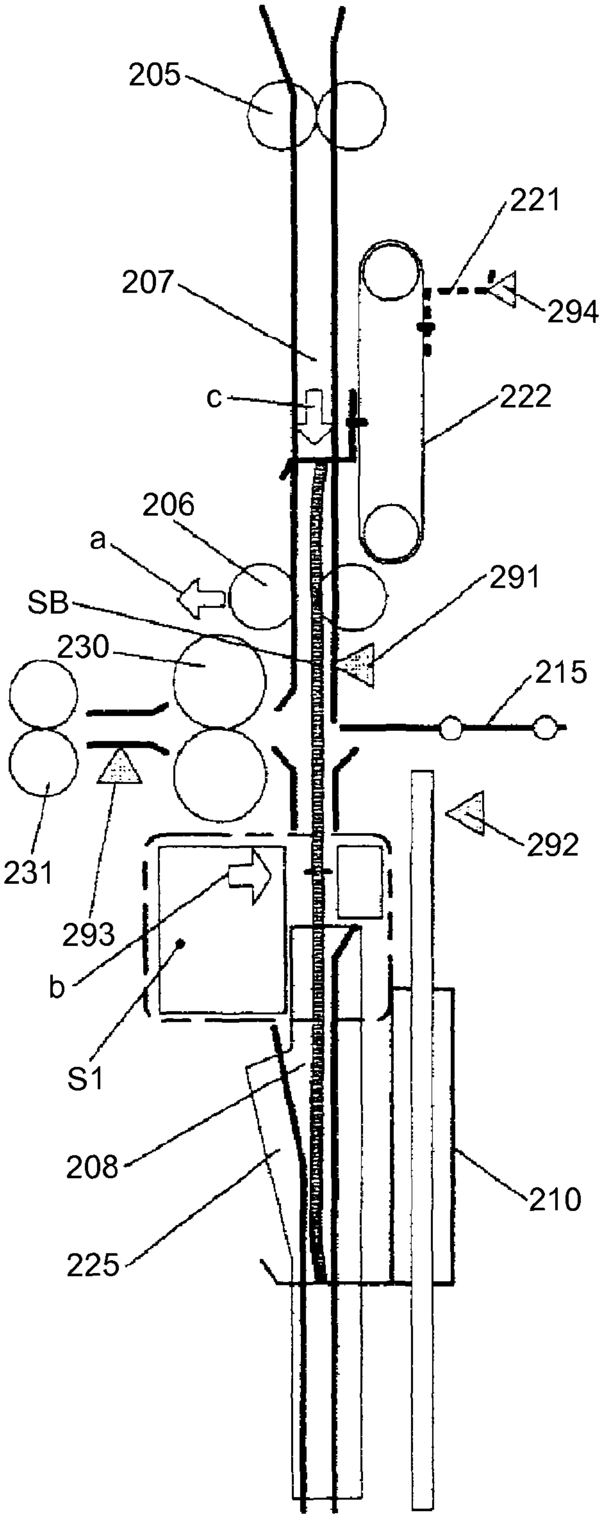
FIG. 4 is an explanatory diagram of the operations to be performed by the saddle-stitch booklet-making apparatus, illustrating a state where the apparatus is saddle stitching the sheet stack.

When, from this state, a nip pressure between the lower stack-conveying rollers 206 is released (in a direction indicated by arrow a) as illustrated in FIG. 4, the leading end of the sheet stack abuts on the movable fence 210, and the sheet stack is stacked on the movable fence 210 with its trailing end unconstrained. At this time, the trailing-end tapping claw 221 is driven to tap the trailing end of the sheet stack SB, thereby performing final alignment of the conveying direction (in a direction indicated by arrow c).

Subsequently, the saddle-stitch jogger fences 225 perform alignment of the width direction (the direction perpendicular to the sheet conveying direction), while the movable fence 210 and the trailing-end tapping claw 221 perform alignment of the conveying direction. Thus, alignment of the sheet stack SB in the width direction and that in the conveying direction is completed. A push-in amount, which is an amount each of the trailing-end tapping claw 221 and the saddle-stitch jogger fences 225 is to be pushed in, for this alignment is adjusted to an optimum value based on the sheet size information, information about the number of sheets in the sheet stack, and/or information about the thickness of the sheet stack.

When the sheet stack is thick, space in the conveying path is lessened. In such a case, it is often the case that a single aligning operation is insufficient to align the sheet stack. Accordingly, in such a case, the number of times the aligning operation is performed is desirably increased. More favorable alignment can be achieved by increasing the number of the aligning operation. Furthermore, as the number of sheets to be overlaid on one another in an upstream stacking process increases, a period of time required for the stacking becomes longer, making a time interval between receipt of sheet stacks SB longer. Therefore, even when the number of times the aligning operation is performed is increased, there is no loss of time for the system, and a favorably aligned state can be achieved efficiently. The number of times of the aligning operation is performed can also be controlled depending on processing time of the upstream process.

The standby position where the movable fence 210 is on standby is generally set to a position where a saddle-stitch position of the sheet stack SB faces a stapling position of the saddle-stitch stapler S1. This is because performing alignment at this position makes it possible to staple the sheet stack SB at the stacked position without moving the movable fence 210 to the saddle-stitch position. A stitcher of the saddle-stitch stapler S1 is moved to the center portion of the sheet stack SB at this standby position in a direction indicated by arrow b to perform stapling between the stitcher and a clincher. The sheet stack SB is thus saddle stitched.

The movable fence 210 is positioned by controlling pulses output from the movable-fence HP sensor 292. The trailing-end tapping claw 221 is positioned by controlling pulses output from the trailing-end-tapping-claw HP sensor 294. A central processing unit (CPU) 251 of a control circuit 250 (see FIG. 15) of the sheet postprocessing apparatus 2 executes positioning control of the movable fence 210 and the trailing-end tapping claw 221.

Figure 5:
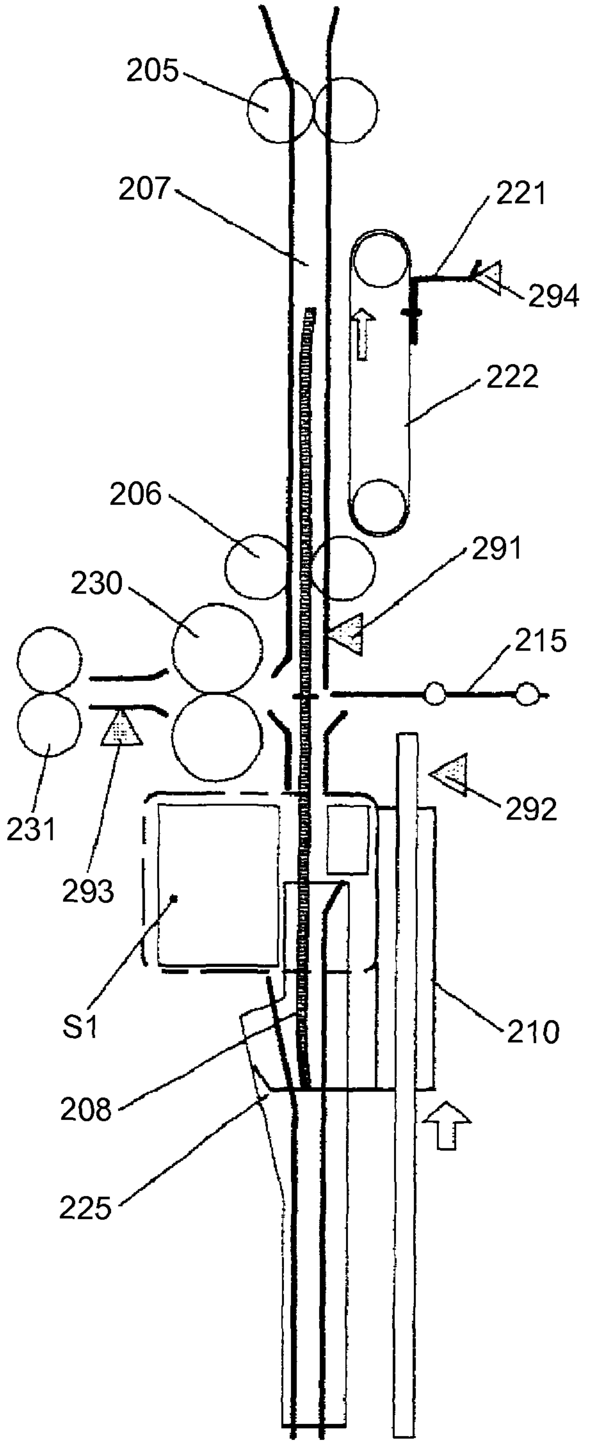
FIG. 5 is an explanatory diagram of the operations to be performed by the saddle-stitch booklet-making apparatus, illustrating a state where the apparatus has moved the sheet stack to a center-folding position.

The sheet stack SB saddle stitched in the state illustrated in FIG. 4 is transported in a state where the pressure applied to the sheet stack SB from the lower stack-conveying rollers 206 is released as illustrated in FIG. 5 to the position where the saddle-stitch position (the center of the sheet stack SB in the conveying direction) faces the folding plate 215 as the movable fence 210 moves upward. This position is also controlled with reference to a position detected by the movable-fence HP sensor 292.

Figure 6:
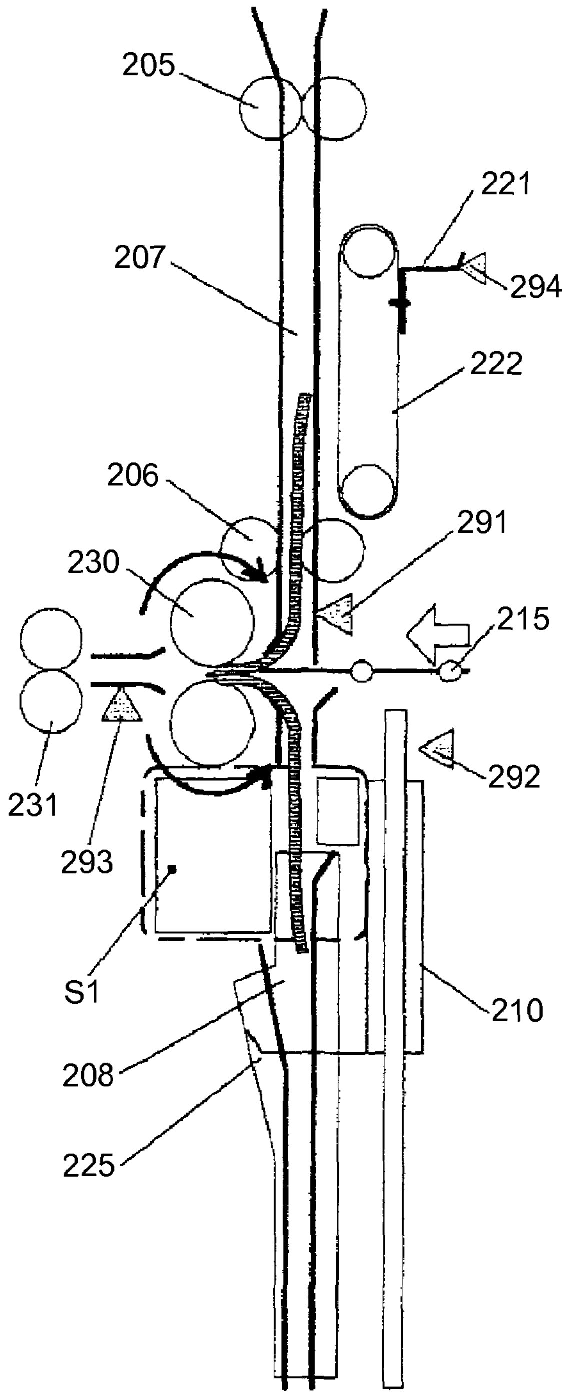
FIG. 6 is an explanatory diagram of the operations to be performed by the saddle-stitch booklet-making apparatus, illustrating a state where the apparatus is center-folding the sheet stack.

When the sheet stack SB reaches the position where the sheet stack SB is depicted in FIG. 5, the folding plate 215 moves toward the nip between the pair of folding rollers 230 as illustrated in FIG. 6. The folding plate 215 abuts on the sheet stack SB near a needle portion, at which the sheet stack SB is stapled, substantially perpendicularly and pushes the sheet stack SB toward the nip. The sheet stack SB is pushed by the folding plate 215 toward the nip between the pair of folding rollers 30, rotation of which has started in advance, and pushed into the nip. The pair of folding rollers 230 presses and conveys the sheet stack SB pushed into the nip. This pressing conveying operation forms a crease in the center of the sheet stack SB. Thus, the booklet BT has been made. FIG. 6 illustrates a state where a leading end of the folded portion of the sheet stack SB is held and pressed in the nip between the pair of folding rollers 230.

Figure 7:
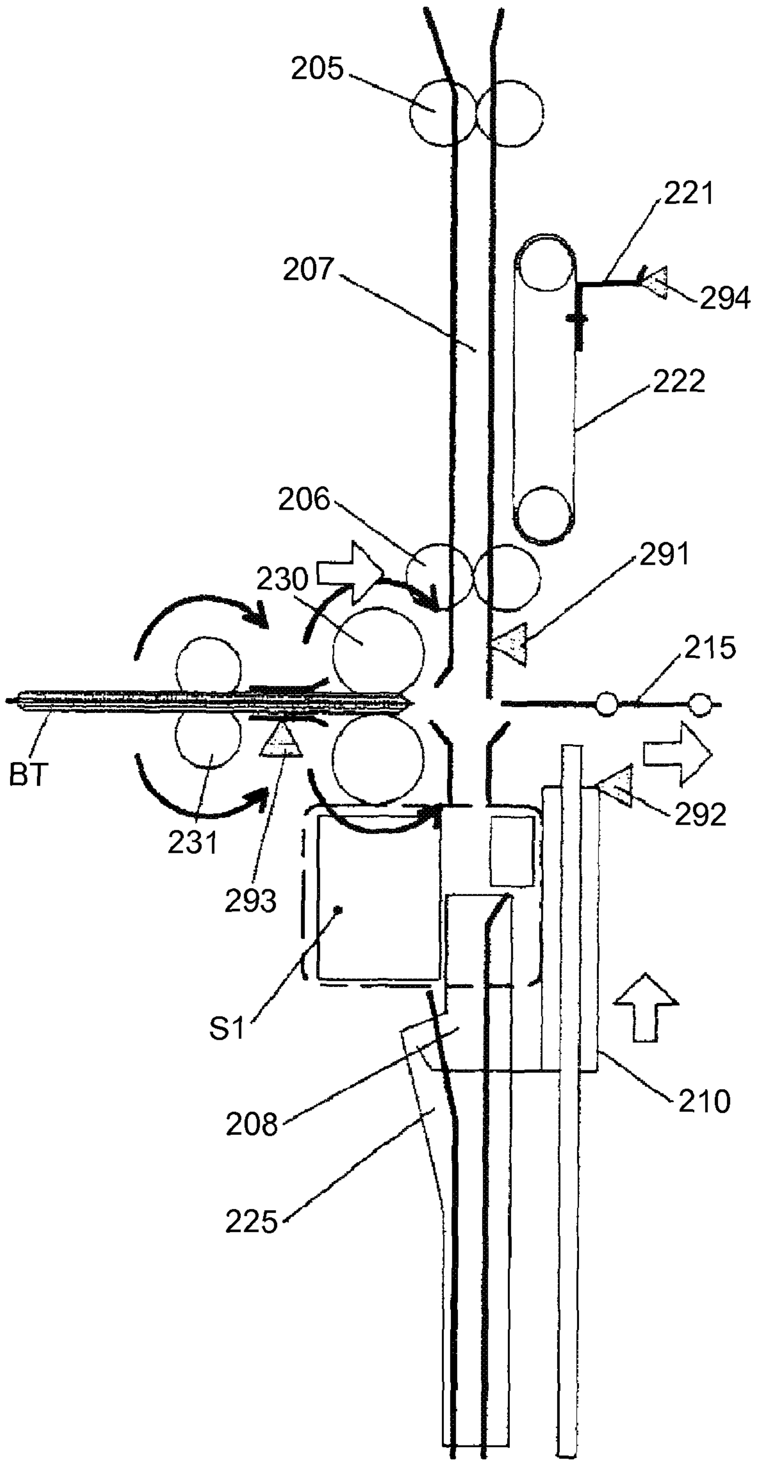
FIG. 7 is an explanatory diagram of the operations to be performed by the saddle-stitch booklet-making apparatus, illustrating a state where the apparatus is discharging the center-folded sheet stack.

The sheet stack SB that is folded in half at its center portion as illustrated in FIG. 6 is conveyed, as the booklet BT, by the pair of folding rollers 230 as illustrated in FIG. 7. The booklet BT is then held between the lower discharging rollers 231 and discharged downstream. When a trailing end of the booklet BT is detected by the crease passage sensor 293 during this conveyance, the folding plate 215 and the movable fence 210 are returned to their home positions, and the lower stack-conveying rollers 206 are returned to a pressing state as preparation for receipt of a next sheet stack SB. The movable fence 210 may be configured to return to the position illustrated in FIG. 3 and be on standby at the position when the next job is identical with the current job in size and number of sheets. These control operations are also executed by the CPU 251 of the control circuit 250.

Figure 8:
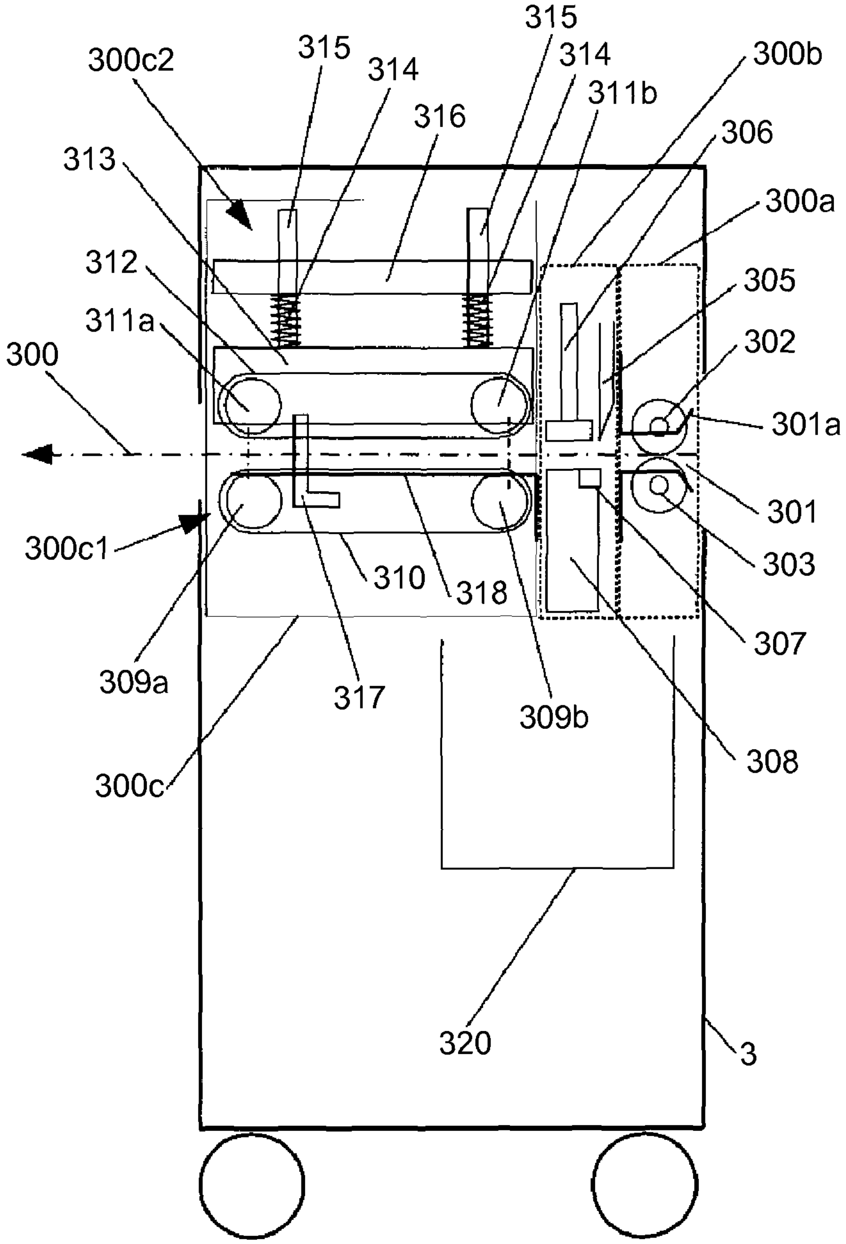
FIG. 8 is a diagram illustrating in detail the configuration of a third sheet processing apparatus (trimmer), which is one of the sheet processing apparatuses illustrated in FIG. 1.

FIG. 8 is a diagram illustrating in detail the configuration of the trimmer 3.

The trimmer 3 includes a conveying unit 300*a*, a trimming unit 300*b*, and an aligning unit 300*c* in this order from upstream to downstream along a conveying path 300 (the arrow in the conveying path 300 indicates a conveyance center in FIG. 8) for booklets.

The conveying unit 300*a* serves as an entrance of the trimming processing apparatus and includes entrance guide plates 301*a*, a pair of conveying rollers 302 and 303 arranged on an upper side and a lower side, and a jogger 319. The jogger 319 performs alignment of the booklet BT in the conveying direction (on a fore edge side) (see FIG. 11). The conveying unit 300*a* receives the booklet BT that is center-folded and saddle-stitched by the lower discharging rollers 231 of the saddle-stitch booklet-making apparatus 2 from the entrance guide plates 301*a* of a booklet receiving port 301. It is possible to use a pair of conveying belts that are arranged on the top side and the bottom side to hold the booklet BT therebetween at a predetermined pressure and capable of conveying the booklet BT in lieu of the pair of conveying rollers 302 and 303.

The trimming unit 300*b* includes trimming blades and a pressing unit arranged with the conveying path 300 therebetween. The trimming blades are an upper trimming blade 305 and a lower trimming blade 307 that are paired and arranged to face each other from above and below the conveying path 300. The upper trimming blade 305 is movable, while the lower trimming blade 307 is fixed. The movable upper trimming blade 305 descends to the booklet BT positioned on the fixed lower trimming blade 307, thereby trimming the fore edge of the booklet BT therebetween. A waste bin 320 that receives waste pieces from the trimmed booklet is arranged below the trimming unit 300*b*.

The pressing unit includes a pressing member 306 that is movable and a base 308 that is fixed. The pressing member 306 and the base 308 are arranged above the conveying path 300 and below the same, respectively. The lower trimming blade 307 is fixed to a most upstream edge portion of the base 308 in the booklet conveying direction. A position where the lower trimming blade 307 is fixed is set to a position that allows trimming to be performed between a cutting edge of the upper trimming blade 305 and a cutting edge of the lower trimming blade 307. The upper trimming blade 305 is moved downward by a driving mechanism (not shown) to a position lower than the lower trimming blade 307 and moved by the same upward to a position where the upper trimming blade 305 does not interfere with the booklet BT conveyed into the trimming unit 300*b*. This standby position on the upper side is an initial position of the upper trimming blade 305.

The pressing member 306 located above the base 308 is moved by a driving mechanism (not shown) upward and downward. The pressing member 306 has a function of holding the booklet BT by pressing a portion of the booklet BT near the trimming blade 305 toward the base 308 when the upper trimming blade 305 is lowered to trim the booklet BT. Each of the upper trimming blade 305 and the pressing member 306 is driven by the driving mechanism (not shown) that uses a motor and a decelerating mechanism coupled to the motor. Alternatively, each of the upper trimming blade 305 and the pressing member 306 may be configured to be moved upward and downward hydraulically rather than by the motor and the decelerating mechanism.

The aligning unit 300*c* includes a lower unit 300*c*1 positioned below the conveying path 300 and an upper unit 300*c*2 positioned above the conveying path 300. The lower unit 300*c*1 includes a first conveying belt 310 that is fixed, the positioning stopper 317, and a guide plate 318. The first conveying belt 310 is stretched around a driving pulley 309*a* and a driven pulley 309*b*. A top surface of the first conveying belt 310 is flush with a top surface of the base 308 and also functions as a reference surface for conveyance of the booklet BT.

The upper unit 300*c*2 includes the second conveying belt 312, a driving pulley 311*a*, a driven pulley 311*b*, a support member 313, guide shafts 315, a pressing plate 316, and compression springs 314. The second conveying belt 312 is stretched around the driving pulley 311*a* and the driven pulley 311*b*. The support member 313 supports the second conveying belt 312, the driving pulley 311*a*, and the driven pulley 311*b* as one piece. The guide shafts 315 are attached to a top surface of the support member 313. The pressing plate 316 is vertically-movably attached to the guide shafts 315. The compression springs 314 are attached to the guide shafts 315 at portions between the support member 313 and the pressing plate 316. The compression springs 314 apply an elastic force in a direction of separating the support member 313 and the pressing plate 316 from each other. The second conveying belt 312, the driving pulley 311*a*, the driven pulley 311*b*, the support member 313, the guide shafts 315, and the pressing plate 316 are movable upward and downward in one piece as the upper unit 101*a* and therefore can relatively change a distance between the top surface of the first conveying belt 310 and a bottom surface of the second conveying belt 312.

This configuration makes it possible to narrow the distance between the first and second conveying belts 310 and 312 when the booklet BT is to be held therebetween. In addition, a distance between the pressing plate 316 and the support member 313 is also changeable. Accordingly, when the pressing plate 316 is further lowered after a top surface of the booklet BT has been pressed by the second conveying belt 312, the compression springs 314 are further compressed. Thus, a holding force or pressing force on the booklet BT can be increased. A driving mechanism (not shown) that moves the upper unit 300*c*2 upward and downward includes, as direct constituents, a motor that moves the pressing plate 316 upward and downward, a power transmission mechanism, and a vertical guide. When the pressing plate 316 is moved upward and downward while maintaining an initial distance between the pressing plate 316 and the support member 313, the entire upper unit 300*c*2 is moved upward and downward. When the pressing plate 316 is further lowered in a state where the second conveying belt 312 is in contact with the top surface of the booklet BT, the compression springs 314 are compressed by this downward motion, causing a pressing force to be exerted by the compression springs 314. This pressing force serves as the holding force or the pressing force on the booklet BT.

The first conveying belt 310 and the second conveying belt 312 have a function of conveying the booklet BT and also function as guides during sheet alignment. The first and second conveying belts 310 and 312 also function as guides during deskewing. Accordingly, each of the first and second conveying belts 310 and 312 has a surface, at which contact with the booklet BT is made, made of a material having a relatively low coefficient of friction against the booklet BT. In addition, the conveying belts 310 and 312 are configured to be similar to each other in friction coefficient. This configuration lightens a force applied to the top of the booklet and a force applied to the bottom of the booklet when the booklet is pressed, and makes the force on the top substantially equal to the force on the bottom, thereby reducing misalignment that can occur when the booklet is pressed.

In the present embodiment, the first and second conveying belts 310 and 312 also have the guiding function to serve as a guide. Alternatively, a configuration in which the guide plate 318 is arranged along the first conveying belt 310 on the bottom side so that the guide plate 318 functions as the guide can be employed. The function of conveying the booklet BT can be performed using another conveying unit such as the first conveying belt 310 or a conveying roller. In this configuration, a top surface of the guide plate 318 is flush with or at a level slightly lower than the top surface of the base 308 and functions as a reference surface for conveyance of the booklet BT.

Another configuration in which the second conveying belt 312 on the top side presses the booklet BT against the guide plate 318 can be employed. Alternatively, an upper guide plate can be arranged on a back surface side of the second conveying belt 312 on the top side.

In the present embodiment, the first conveying belt 310 on the bottom side is fixed, while the second conveying belt 312 on the top side ascends and descends. Alternatively, a configuration in which the second conveying belt 312 on the top side is fixed, while the first conveying belt 311 on the bottom side is movable, or a configuration in which both the first and second conveying belts 310 and 312 are movable can be employed.

The positioning stopper 317 provided in the aligning unit 300*c* includes a moving mechanism (not shown) that is movable in the booklet conveying direction. The positioning stopper 317 is moved by the moving mechanism to a predetermined position based on the information about the size of the booklet BT, a trim size, or the like and performs positioning by being abutted by the spine of the booklet BT. Meanwhile, the moving mechanism includes a motor and a power transmission mechanism for the motor.

FIGS. 9 to 14 are schematic diagrams illustrating trimming operations to be performed by the trimmer according to the embodiment. FIG. 15 is a block diagram illustrating a control structure of the image forming system according to the embodiment.

Referring to FIG. 15, the first sheet postprocessing apparatus 1, the second sheet postprocessing apparatus (saddle-stitch booklet-making apparatus) 2, and the third sheet postprocessing apparatus (trimmer) 3 are connected as downstream apparatuses to the image forming apparatus PR in the image forming system according to the embodiment as illustrated in FIG. 1. The image forming apparatus PR and the sheet postprocessing apparatuses 1, 2, and 3 include a CPU PR1, a CPU 151, the CPU 251, and the CPU 351 and a control circuit PR0, a control circuit 150, the control circuit 250, and a control circuit 350, respectively. Each of the control circuits PR0, 150, 250, and 350 includes a microcomputer aboard that includes a read-only memory (ROM), a random access memory (RAM), and an I/O interface. The image forming apparatus PR and the sheet postprocessing apparatuses 1, 2, and 3 are connected, in terms of control, in series via communication ports PR2, 161, 162, 261, 262, and 361. The CPU PR1 of the control circuit PR0 of the image forming apparatus PR functions as a main CPU. The CPUs 151, 251, and 351 of the control circuits 150, 250, and 350 of the first to third sheet postprocessing apparatuses 1, 2, and 3 function as sub CPUs under control of the CPU PR1 which is the main CPU. The operation panel PN that functions as a man-machine interface is connected to the image forming apparatus PR so that inputs can be received from an operator and a notification can be provided to the operator via a display device.

Put another way, each of sections of the sheet postprocessing apparatuses 1, 2, and 3 is controlled by a corresponding one of the CPUs 151, 251, and 351 mounted on the apparatus; system control is executed by the CPU PR1 of the image forming apparatus PR. As for control operations to be performed by the apparatuses, each of the CPUs 151, 251, and 351 reads program codes stored in the ROM of the corresponding apparatus, and executes control operation based on a program defined in the program codes while using the RAM of the apparatus as a working area and a data buffer. The CPU 151 of the first sheet postprocessing apparatus 1 can carry out mutual communications using the communications port 161 with the CPU PR1 of the image forming apparatus PR via the communications port PR2 of the image forming apparatus PR. Each of the CPUs 251 and 351 of the second and third sheet postprocessing apparatuses 2 and 3 can carry out mutual communications with the CPU PR1 of the image forming apparatus PR via the communications port on the side of the image forming apparatus PR and the CPU. In the image forming system configured as described above, information necessary for the CPU PR1 of the image forming apparatus PR to execute control is transmitted to the image forming apparatus PR from the CPUs 351, 251, and 151 of the third sheet postprocessing apparatus 3, the second sheet postprocessing apparatus 2, and the first sheet postprocessing apparatus 1; control signals output from the CPU PR1 of the image forming apparatus PR are transmitted to the CPUs 151, 251, and 351 of the first sheet postprocessing apparatus 1, the second sheet postprocessing apparatus 2, and the third sheet postprocessing apparatus 3.

The booklet information is transmitted from the CPU PR1 of the image forming apparatus PR to the CPU 351 of the trimmer 3 which is the third postprocessing apparatus as described above. The CPU 351 of the trimmer 3 performs pressing operation and the trimming operations described above based on the received booklet information.

Operations to be performed by the trimmer 3 and processing related to the operations are described below with reference to the explanatory operation diagrams illustrated in FIGS. 9 to 14.

Figure 9:
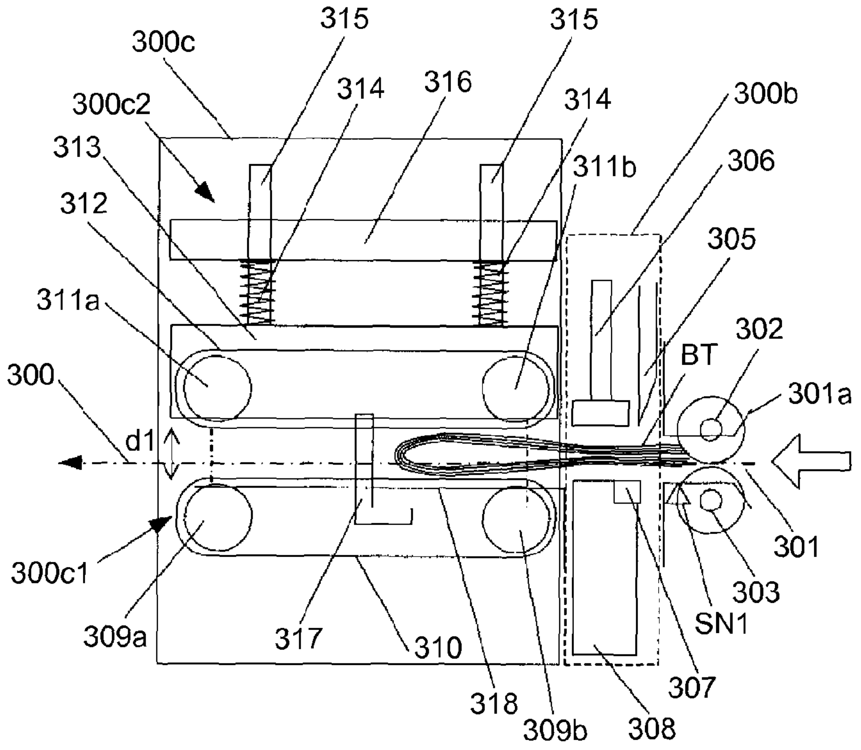
FIG. 9 is an explanatory diagram of trimming operations to be performed by the trimmer, illustrating a state immediately after a booklet is conveyed into the trimmer.

FIG. 9 is a schematic diagram illustrating a state immediately after the booklet BT is conveyed into the trimmer 3. In FIG. 9, the booklet BT is conveyed through between the entrance guide plates 301*a* into the trimmer 3. At this time, each section of the trimmer 3 starts booklet-receipt preparing operation when a booklet-leading-end detection signal output from an entrance sensor SN1 provided immediately downstream of the booklet receiving port 301 or a leading-end-of-folded-portion detection signal output from the crease passage sensor 293 of the saddle-stitch booklet-making apparatus 2 is detected. The booklet-receipt preparing operation is an operation of lowering the upper unit 300*c*2 from its initial position. The booklet-receipt preparing operation brings the upper unit 300*c*2 to a position where a distance between the bottom surface of the second conveying belt 312 and the top surface of the first conveying belt 310 is the first distance d1 for sheet carry-in. The first distance d1 is determined by the CPU 351 based on the booklet information about a sheet thickness, a sheet size, the number of sheets to be stapled, special paper, or the like by consulting a database stored in a memory (not shown) in the control circuit 350 of the trimmer 3. This will be described later. The distance d1 is such a distance that permits the first and second conveying belts 310 and 312 to convey the booklet BT by friction on the booklet BT after the booklet BT has been conveyed into the trimmer 3 by the pair of conveying rollers 302 and 303. In short, the distance d1 can be any distance so long as the booklet BT can be conveyed.

The positioning stopper 117 moves to a position where sheet positioning is to be performed according to the information about the booklet size, the trim size, and/or the like. When the positioning stopper 317 has moved to the position, the pair of conveying rollers 302 and 303 and the first and second conveying belts 310 and 312 start rotating to start receiving the booklet BT. The driving pulleys 309*a* and 311*a* of the first and second conveying belts 310 and 312 are connected in driving relation to each other to make rotations of the first and second conveying belts 310 and 312 in phase. The first and second conveying belts 310 and 312 in this state stop rotating when a predetermined period of time has elapsed after the entrance sensor SN1 has detected the leading end of the spine (the crease) of the booklet BT conveyed into the trimmer 3. The leading end (the crease or spine shearing) of the booklet BT is stopped at a position upstream from the positioning stopper 117 by a predetermined distance.

Figure 10:
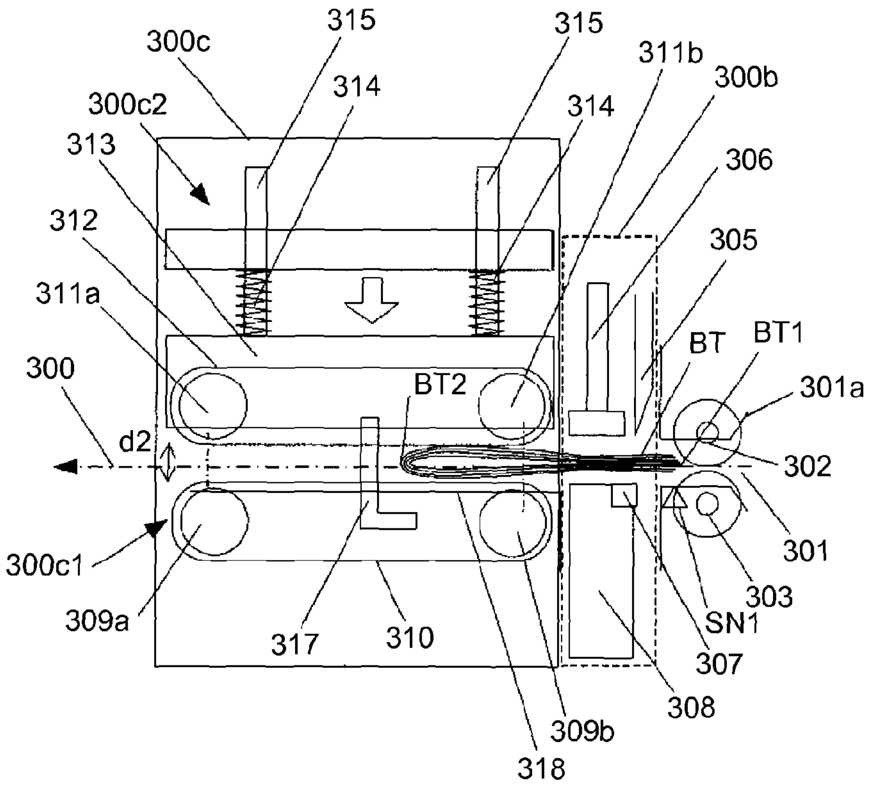
FIG. 10 is an explanatory diagram of the trimming operations to be performed by the trimmer, illustrating an operation of pressing the booklet conveyed into the trimmer and stopped to a predetermined thickness.

FIG. 10 is an explanatory diagram of an operation of pressing the stopped booklet to a predetermined thickness. After the booklet BT has stopped in the state illustrated in FIG. 9, the upper unit 300*c*2 descends to a position where the distance between the top surface of the first conveying belt 310 and the bottom surface of the second conveying belt 312 is the second distance d2. The booklet BT that is swollen and thick is pressed to the predetermined thickness in this way. The second distance d2 is determined as the alignment distance according to the booklet information about the sheet thickness, the sheet size, the number of sheets to be stapled, special paper, or the like as is the first distance d1. In this state, only the position of the support member 313 has been changed to an aligning position.

Figure 11:
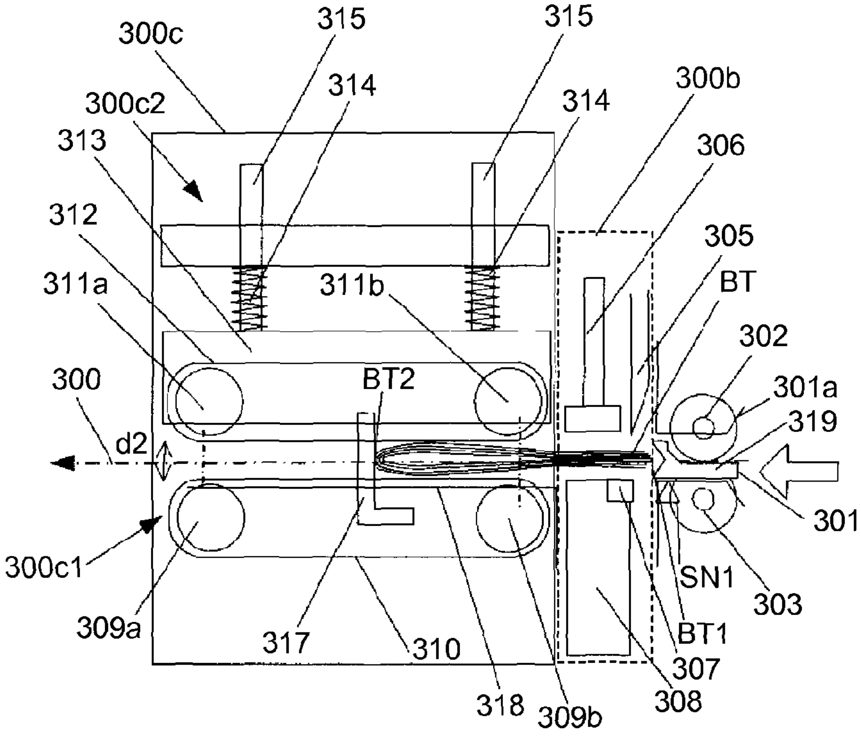
FIG. 11 is an explanatory diagram of the trimming operations to be performed by the trimmer, illustrating an operation of deskewing the booklet.

FIG. 11 is an explanatory diagram of an operation of aligning the booklet in the conveying direction to perform deskewing. The booklet BT in the state illustrated in FIG. 10 is pushed into the second distance d2. The trailing-end jogger 319 is operated in a state where the second distance d2 is maintained. The trailing-end jogger 319 presses the fore edge (a trailing-end portion BT1) of the booklet BT toward the positioning stopper 317, causing the spine (a leading-end portion BT2 in the conveying direction) of the booklet BT to abut on the positioning stopper 317. The booklet BT is thus positioned in the conveying direction. The distance d2 is such a distance at which the booklet BT is pressed and the trailing-end jogger 319 can move the booklet BT toward the positioning stopper 317 in a state where the booklet BT is neither skewed nor distorted; in other words, a distance that allows holding down a sheet height and performing the aligning operation.

A method of causing the booklet BT to be moved by the first and second conveying belts 310 and 312 can alternatively be employed as a method for causing the booklet BT to abut on the positioning stopper 319. However, a surface sheet of the booklet BT can be undesirably curled in a case where the conveying force of the first and second conveying belts 310 and 312 is large. For such a case, it is necessary to set the conveying force of the first and second conveying belts 310 and 312 so as to prevent occurrence of the curling in the booklet BT. The present embodiment employs the trailing-end jogger 319 to avoid occurrence of such curling.

Figure 12:
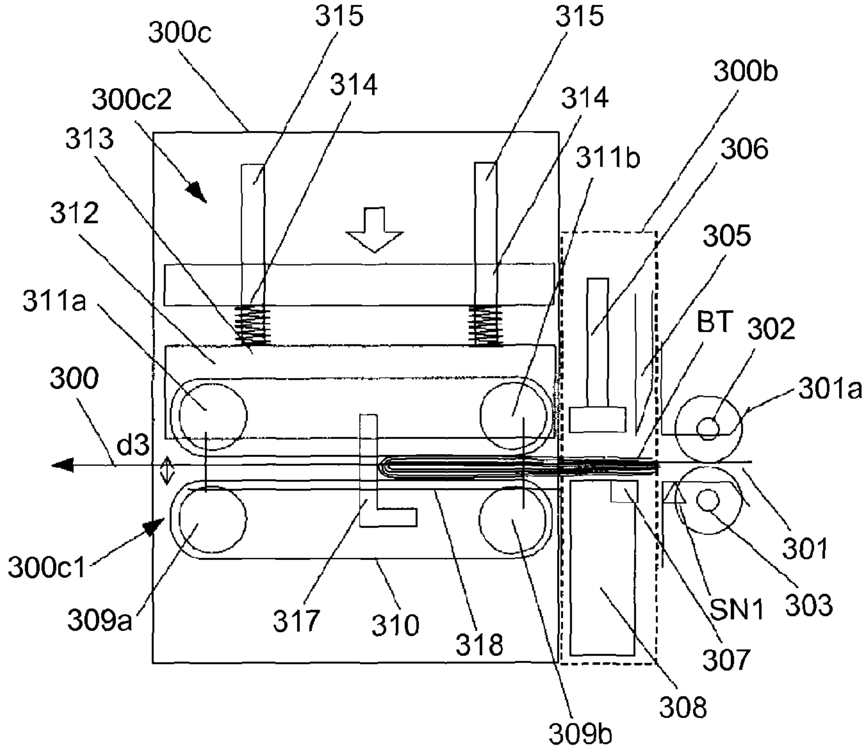
FIG. 12 is an explanatory diagram of the trimming operations to be performed by the trimmer, illustrating an operation of fixing the booklet by pressing the booklet.

FIG. 12 is an explanatory diagram of an operation of fixing the booklet by pressing the booklet. When the booklet BT is positioned by the trailing-end jogger 319 against the positioning stopper 317, the upper unit 300*c*2 is further lowered to a position where the distance between the bottom surface of the second conveying belt 312 and the top surface of the first conveying belt 310 is the third distance d3. As a result, the booklet BT is fixed between the first and second conveying belts 310 and 312 by being pressed against the lower unit 300*c*1.

At this time, the pressing plate 316 is further lowered after the first conveying belt 312 has abutted on the top surface of the booklet BT. As a result, the elastic force of the compression springs 314 is applied to the booklet BT as a pressing force in a state where the booklet BT is held in a minimum thickness of the booklet BT. Accordingly, the pressing force applied to the booklet BT can be controlled by changing or setting a descent amount of the pressing plate 316. A descent amount (i.e., the distance between the first and second conveying belts 310 and 312) of the upper unit 300*c*2 and the descent amount of the pressing plate 316 are determined according to the booklet information about the sheet thickness, the sheet size, the number of sheets to be stapled, and paper type (special paper or the like). The distance d3 is a distance that permits pressing the booklet BT to its minimum thickness in a state where each sheet in the booklet BT is straightened to thereby finish the booklet BT to a final thickness; that is, a distance that permits fixing the booklet BT by pressing the booklet BT.

Figure 13:
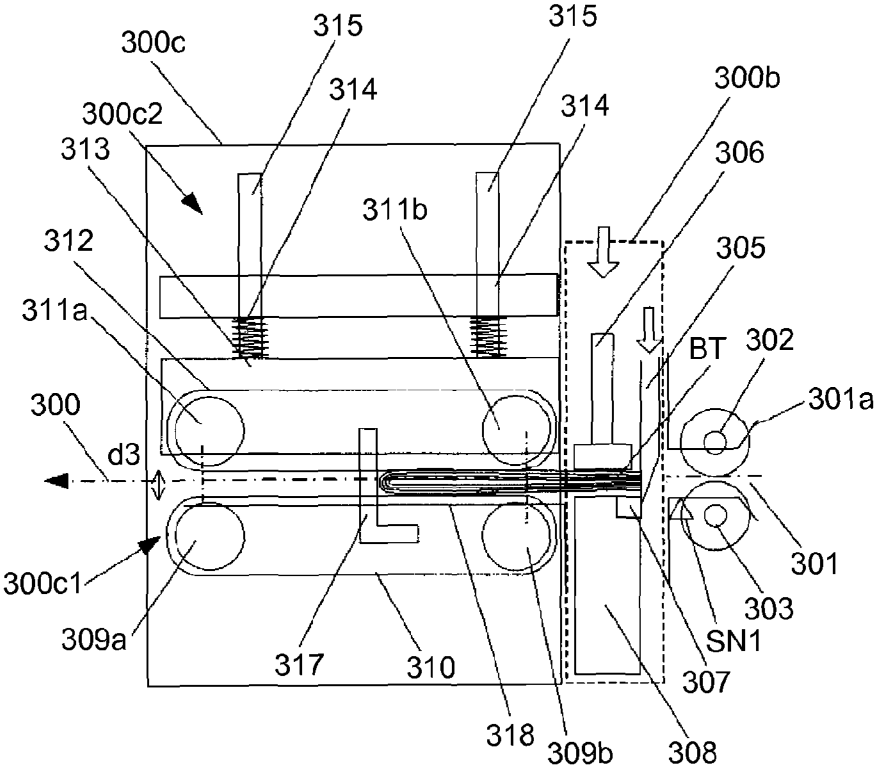
FIG. 13 is an explanatory diagram of the trimming operations to be performed by the trimmer, illustrating an operation of trimming the booklet after deskewing.

FIG. 13 is an explanatory diagram of an operation of trimming the booklet after the booklet is aligned. After the booklet BT is positionally aligned, and fixed by being pressed as illustrated in FIG. 12, the pressing member 306 arranged near the upper trimming blade 305 is lowered to press a portion, which is near a to-be-trimmed position, of the booklet BT against the top surface of the base 307. The upper trimming blade 305 is lowered to trim the fore edge of the booklet BT between the upper trimming blade 305 and the lower trimming blade 307. Waste pieces from the fore edge of the trimmed booklet are stocked in the waste bin 320. The descent amount of the pressing plate 316 is such an amount that permits the compression springs 314 to apply a pressing force with which each of sheets, particularly the surface sheet, of the booklet BT can be held and fixed without misalignment when the pressing member 306 is lowered to press the fore edge side of the booklet BT against the top surface of the base 306.

Figure 14:
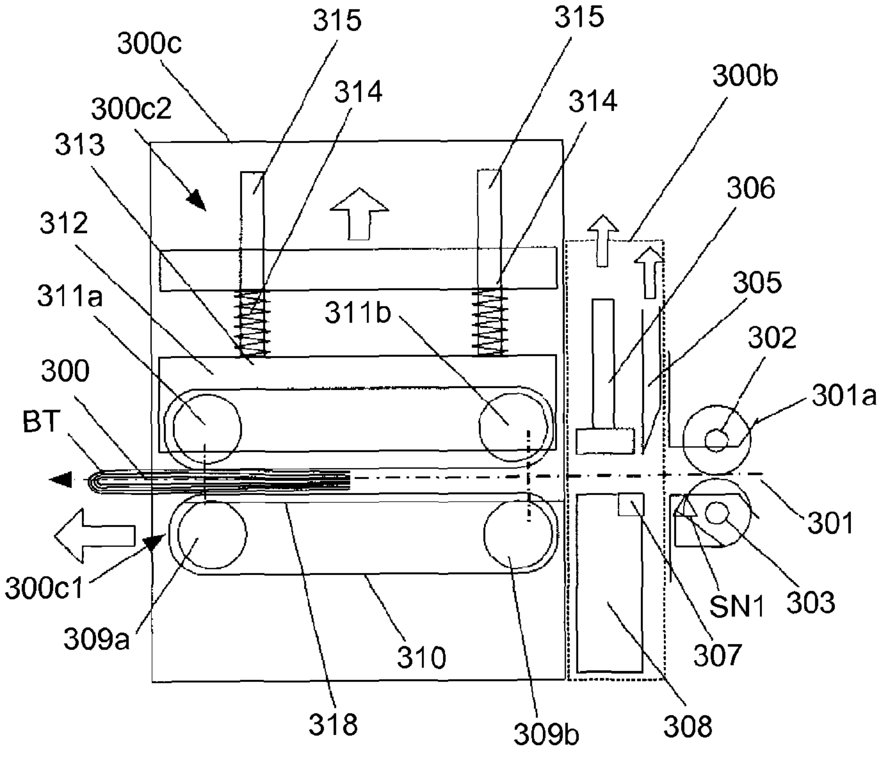
FIG. 14 is an explanatory diagram of the trimming operations to be performed by the trimmer, illustrating an operation after completion of trimming.
Figure 15:
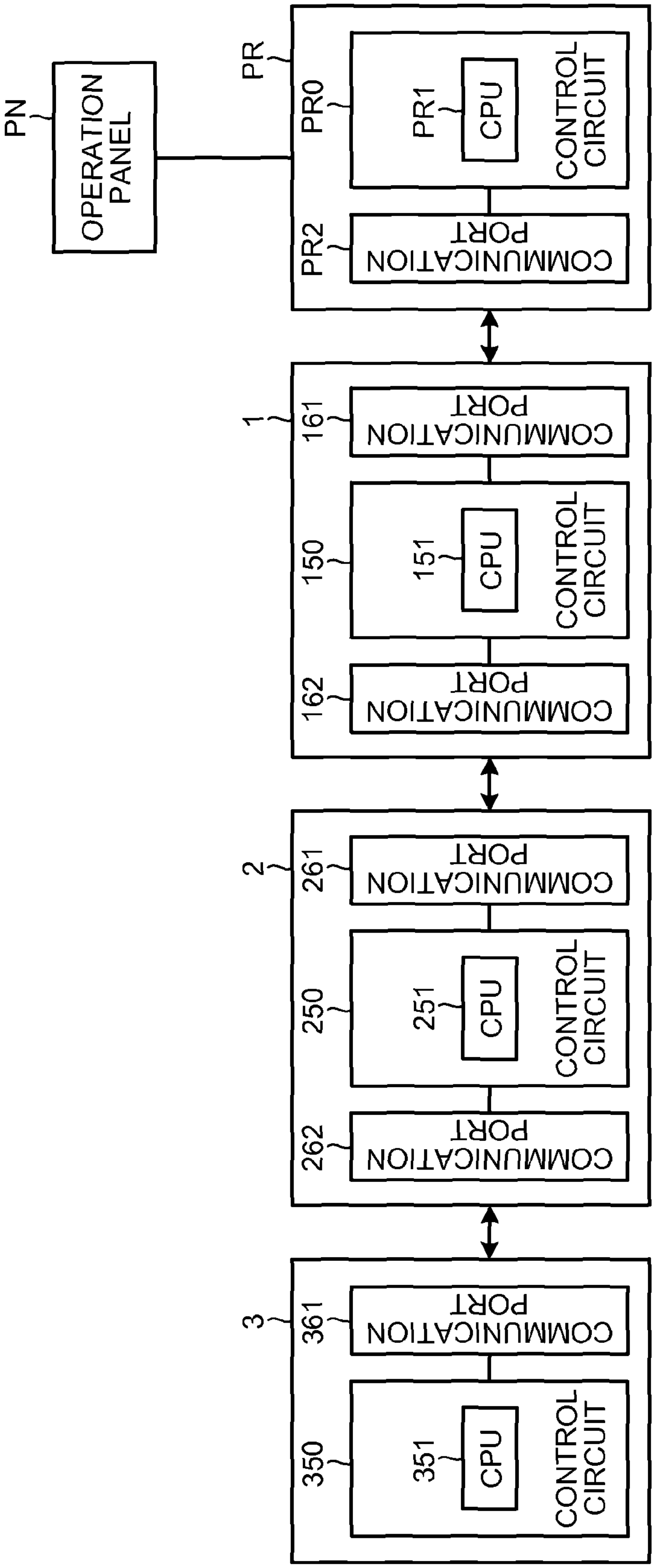
FIG. 15 is a block diagram illustrating a control structure of the image forming system according to the embodiment.

FIG. 14 is an explanatory diagram of an operation after trimming. After the trimming illustrated in FIG. 13, the upper trimming blade 105 and the pressing member 106 retreat upward to their initial positions. Subsequently, the pressing plate 316 and the upper unit 300*c*2 move upward to lessen the pressure applied to the booklet BT to a pressure level at which the booklet is conveyable. The distance each of the pressing plate 316 and the upper unit 300*c*2 is to be moved upward at this time is determined according to the booklet information about the sheet thickness, the sheet size, the number of sheets to be stapled, paper material (special paper), or the like. Thereafter, the first and second conveying belts 310 and 312 are rotated in the conveying direction to discharge the booklet BT having its fore edge trimmed out of the trimmer 300. A series of the operations performed in the trimmer 300 completes at a time when the booklet BT has been discharged.

The database to be consulted for the first to third distances d1, d2, and d3 and the descent amount of the pressing plate 316 is a database on optimum values of the first to third distances d1, d2, and d3 and the descent amount of the pressing plate 316. The optimum values are determined in advance using a real device before shipment for each combination of elements of each of booklets BT that are possibly trimmed by the trimmer 3. The elements are the sheet thickness, the sheet size, the number of sheets to be stapled, and the paper type (special paper or the like). For example, booklet information indicating that the sheet thickness is regular, the sheet size is A3, the number of sheets to be stapled is ten, and the paper type is ordinary paper is transmitted to the CPU 351 of the trimmer 3 from the CPU PR1 of the image forming apparatus PR. For example, the sheet thickness in this example is classified into thin paper, regular paper, and thick paper; the sheet thickness is expressed in basis weight (g/m$^2$). Upon receiving the booklet information, the CPU 351 obtains the first to third distances d1, d2, and d3 and the descent amount of the pressing plate 316 associated with the booklet information from the database in the memory to thereby determine the first to third distances d1, d2, and d3 and the descent amount of the pressing plate 316. By determining the distances and the amount in this way, trimming can be performed in a state where the booklet BT is held with an optimum holding force or pressing force.

Holding the booklet BT in this way reduces development of flexure in the booklet BT and prevents misalignment that can occur when the booklet BT is pressed by the pressing member, thereby enabling highly accurate sheet processing.

As described above, the present embodiment makes it possible to perform highly accurate sheet processing by reducing development of flexure in the booklet BT and preventing misalignment that can occur when the booklet BT is pressed by the pressing member. However, the coefficients of static friction of the first and second conveying belts 310 and 312 of the present embodiment are smaller than those of the conventional configuration. Therefore, the conveying force for conveying the booklet BT of the present embodiment is smaller than that of the conventional configuration in which the coefficients of static friction are relatively large. Accordingly, positioning of the booklet BT, deskewing, moving out (conveying) the booklet BT after trimming and the like arise as problems to be solved.

Figure 16:
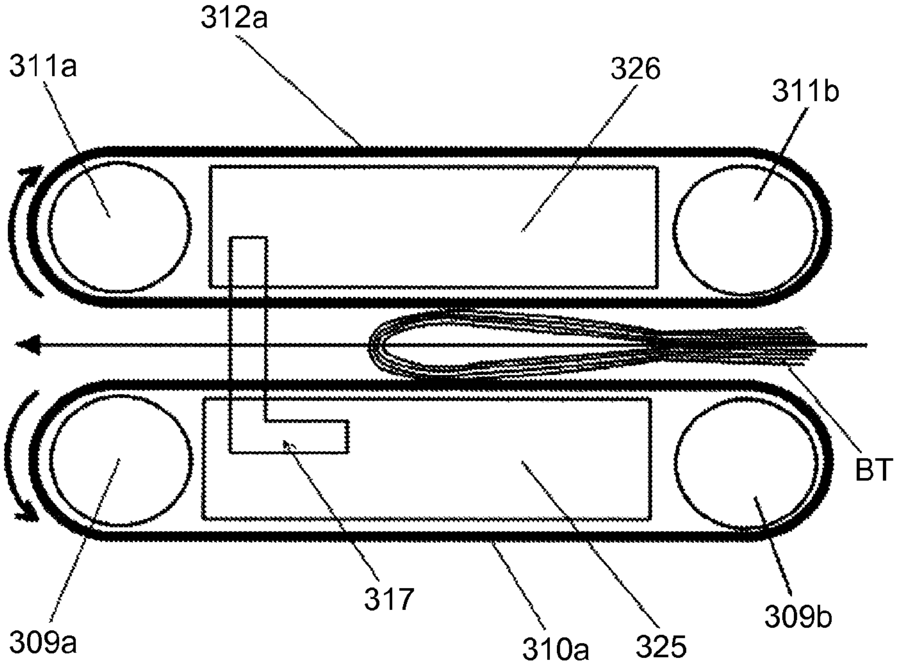
FIG. 16 is a front view illustrating an upper unit and a lower unit each having a mechanism for changing a conveying force according to the embodiment.
Figure 17:
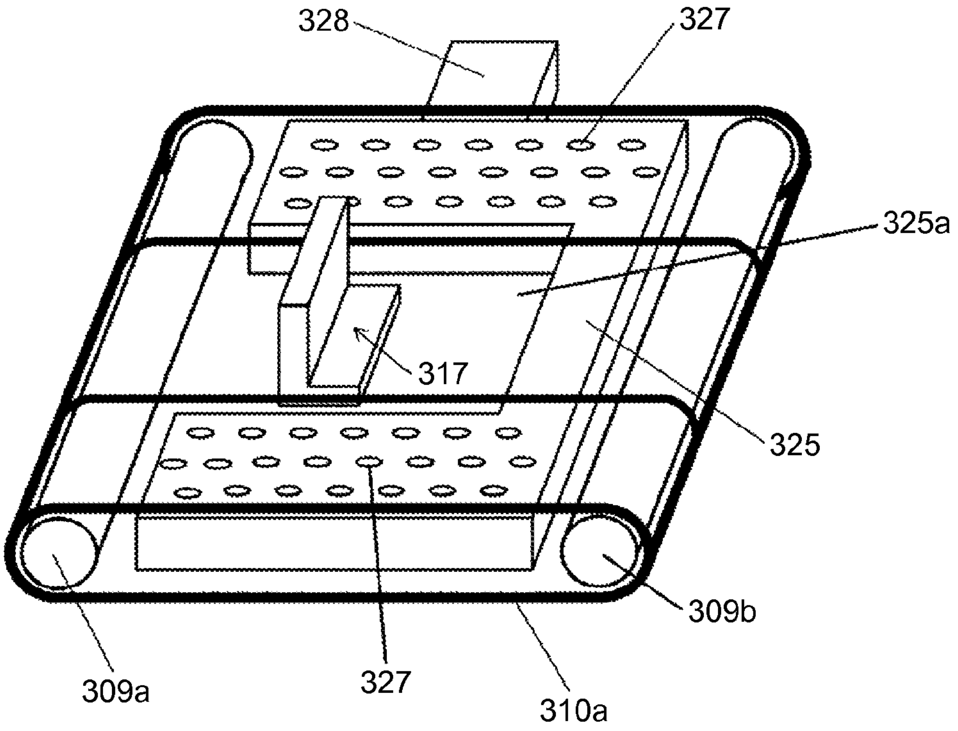
FIG. 17 is a perspective view illustrating the lower unit having the mechanism for changing a conveying force according to the embodiment.

In the present embodiment, the conveying force for conveying the booklet BT is adjustable in magnitude between when the booklet BT is fixed by being pressed and when the booklet BT is conveyed. FIGS. 16 and 17 are diagrams for explaining an upper unit and a lower unit each having a mechanism for changing a conveying force according to the present embodiment. FIG. 16 is a front view of the upper and lower units. FIG. 17 is a perspective view of the lower unit.

In the present embodiment, a first vacuum belt device 325 is arranged between belts of the first conveying belt 310 of the lower unit 300*c*1, and a second vacuum belt device 326 is arranged between belts of the second conveying belt 312 of the upper unit 300*c*2. A first vacuum belt 310*a* and a second vacuum belt 312*a* that include the first conveying belt 310 and the second conveying belt 312, respectively, are provided. As illustrated in FIG. 17, the first vacuum belt device 325 includes a body that is U-shaped in plan view to prevent interference with the positioning stopper 317. The positioning stopper 317 is located in a space section 325*a* inside the U-shape. The second vacuum belt device 326 has a similar configuration.

A large number of air-sucking-and-blowing orifices 327 are arranged in the body of the first vacuum belt device 325 on a side where the booklet BT is conveyed. The body is hollow and connected to an external air blower (not shown) via an outside-air-sucking-and-blowing unit 328. Being configured in this way, the first vacuum belt device 325 performs air suction or air blowing through the air-sucking-and-blowing nozzles 327 depending on a rotation direction of the air blower. The second vacuum belt device 326 has a similar configuration to that of the first vacuum belt device 325 except for that the air-sucking-and-blowing orifices 327 of the second vacuum belt device 326 are directed downward.

The first and second vacuum belts 310*a* and 312*a* are endless belts in which air-flowing holes, through which air sucked or to be blown through the air-sucking-and-blowing orifices 327 passes, are defined. The first and second vacuum belts 310*a* and 312*a* are combined with the first and second vacuum belt devices 325 and 326. This combination makes it possible to suck air from the conveying path 300 or blow air into the conveying path 300. It is therefore possible to pull or drive the booklet BT conveyed along the conveying path 300 toward or away from the vacuum belts.

The CPU 351 of the trimmer 3 controls driving of a motor of the air blower. Accordingly, it is possible to control a suction force by controlling a rotation speed (the number of rotations per unit time) of the air blower and hence to control the conveying force of the vacuum belts.

More specifically, an amount of air to be sucked or blown through the outside air-sucking-and-blowing unit 328 is controlled using the air blower in the first and second vacuum belts 310*a* and 312*a*. Air is sucked into the body via the air-sucking-and-blowing orifices 327 from the surfaces of the first and second vacuum belts 310*a* and 312*a* on the sides of the conveying path 300 or supplied from the body via the air-sucking-and-blowing orifices 327 to the surfaces of the first and second vacuum belts 310*a* and 312*a* on the sides of the conveying path 300. Air suction is performed while the booklet BT is conveyed to increase the conveying force in magnitude, whereas air suction is not performed while the booklet BT is fixed by being pressed to produce a resistance force. Furthermore, it is possible to reduce the resistance between a surface of the surface sheet BT10 and the vacuum belts when it is necessary to further reduce the resistance according to booklet information about the surface sheet BT10 by causing air to be blown out through the air-sucking-and-blowing orifices 327 while the booklet BT is pressed.

Figure 18:
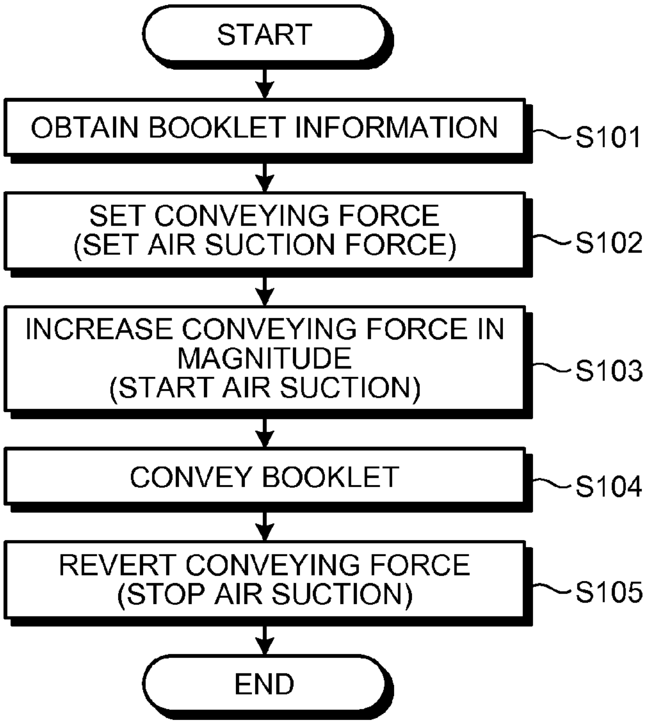
FIG. 18 is a flowchart for control operations to be performed to change a conveying force in magnitude to be exerted while the booklet is conveyed.
Figure 19:
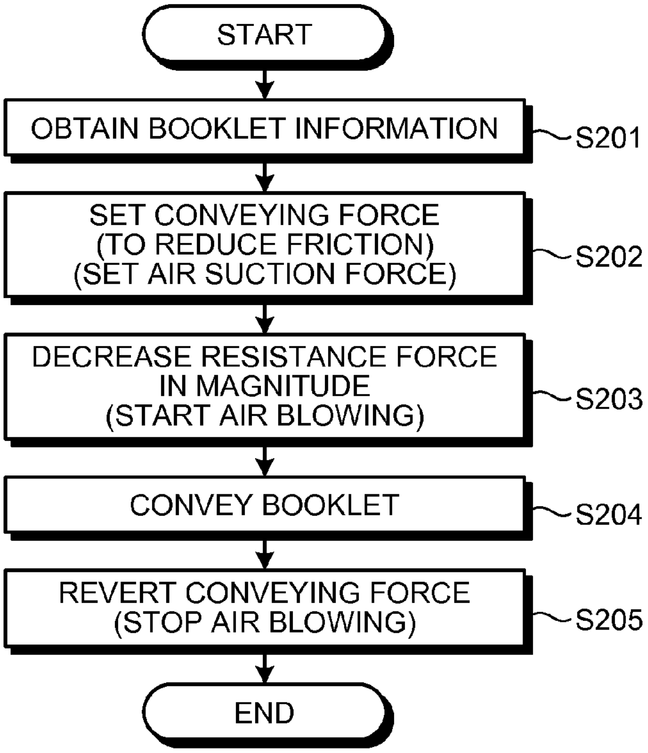
FIG. 19 is a flowchart for control operations to be performed to change a conveying force (resistance force) to be exerted while the booklet is fixed by being pressed.
Figure 20:
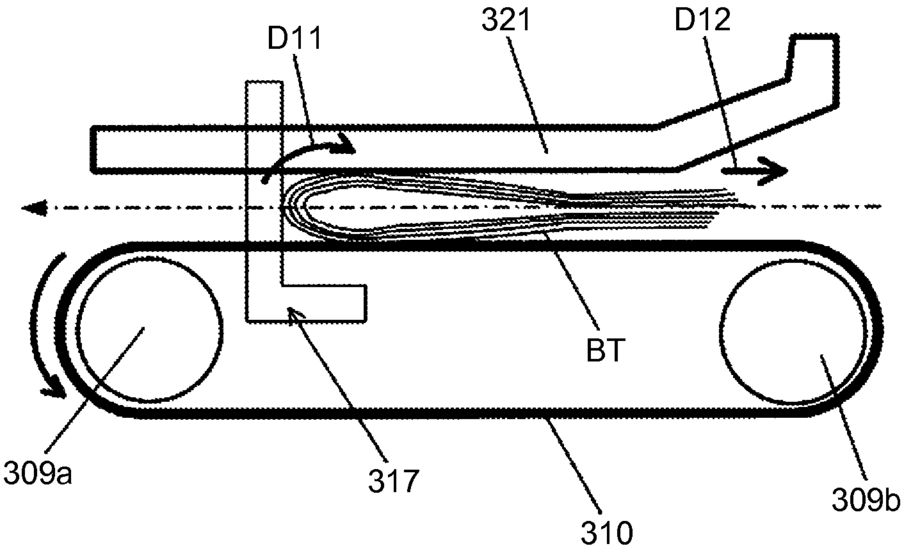
FIG. 20 is an explanatory diagram of a disadvantage of a conventional technique, illustrating an example where the booklet is pressed by a guide member on a top side.

FIGS. 18 and 19 are flowcharts illustrating procedures for control operations to be performed to change the conveying force or the resistance force in magnitude. The operations are executed by the CPU 351 of the trimmer 3. FIG. 18 is a flowchart illustrating the procedure for control operations during booklet conveyance. According to the procedure, booklet information is obtained from the CPU PR1 of the forming apparatus PR first (Step S101). A conveying force is set based on the obtained booklet information (Step S102). The conveying force to be set at Step S102 is the suction force for air sucked through the air-sucking-and-blowing orifices 327. Air suction is started from an initial state (a state where neither air suction nor air blowing is performed) to increase the conveying force in magnitude (Step S103), thereby conveying the booklet BT (Step S104). When conveyance to a predetermined position is completed, the air suction is stopped to cause the conveying force to revert to a previous state, or, more specifically, to the state where the conveying force is generated only by action of the frictional force between the surface sheet BT1 of the booklet BT, and the first and second conveying belts 310 and 312 (Step S105).

When the booklet BT is to be fixed by being pressed, the booklet information is obtained as illustrated in FIG. 19 (Step S201). The conveying force is set based on the obtained booklet information (Step S202). The conveying force to be set at Step S202 is an air-blowing force for air blown out through the air-sucking-and-blowing orifices 327. Air blowing is started from the initial state (the state where neither air suction nor air blowing is performed) to decrease the resistance force in magnitude (Step S203). The booklet BT in this state is pressed until the third distance d3 is attained (Step S204). When alignment is completed, the air blowing is stopped to cause the conveying force to revert to a previous state, or, more specifically, to the state where the conveying force (resistance force) is generated only by the action of the frictional force between the surface sheet BT1 of the booklet BT, and the first and second conveying belts 310 and 312 (Step S205).

The control operations described above make it possible to decrease the conveying force (resistance force) in magnitude to prevent development of the flexure BT10 when the booklet BT is fixed by being pressed, and to increase the conveying force (resistance force) in magnitude when the booklet BT is conveyed so that the booklet BT can be conveyed with a sufficiently-large conveying force.

FIGS. 16 and 17 illustrate an example where the conveying force is changed using the vacuum belt device 326. Alternatively, there can be employed a configuration in which the conveying force is changed using electrostatic attraction belts in a manner such that a force of attracting the surface sheet BT1 of the booklet BT is changed by controlling an amount of electrostatic charges built on the electrostatic attraction belt.

The booklet information is used also in the procedures for the control operations illustrated in FIGS. 18 and 19. Also in this case, the rotation direction and the rotation speed of the air blower corresponding to an optimum conveying force (resistance force) are to be set by consulting a database stored as a memory table based on the obtained booklet information. The database contains optimum values of the rotation direction and the rotation speed of the air blower that are determined in advance using a real device before shipment for each combination of information about elements, such as the sheet thickness, the sheet size, the number of sheets to be stapled, and special paper. The rotation direction and the rotation speed of the air blower are set by the CPU 351 by controlling the motor that drives the air blower as described above. When the electrostatic attraction belts are used, the force of attracting the surface sheet BT1 is set by the CPU 351 by controlling voltages to be applied to the electrostatic attraction belts.

In the present embodiment, the image forming system includes the trimmer 3 as one element, and the control operations described above are executed in the trimmer 3. Accordingly, a configuration in which the CPU PR1 of the image forming apparatus PR that functions as the main CPU of the system executes the control operations can be employed.

As described above, the present embodiment yields the following effects.

1) The booklet conveying device includes means that changes the conveying force of the first conveying belt 310 and the second conveying belt 312 in magnitude.

Accordingly, it is possible to press and fix the booklet BT conveyed to the booklet conveying device without causing misalignment of the booklet BT by changing the conveying force in magnitude as needed.

2) When the booklet BT is to be conveyed, the conveying force is changed in magnitude from a first magnitude to a second magnitude that is greater than the first magnitude. The conveying force of the first magnitude is to be exerted when the booklet BT is fixed by being pressed. The conveying force of the second magnitude is to be exerted when the booklet is conveyed. Accordingly, the conveyance force can be ensured while preventing development of flexure in the booklet BT.

3) The conveying force is changed in magnitude based on the booklet information that contains information about at least one of the sheet thickness, the sheet size, the number of sheets to be stapled, and the special paper. Accordingly, it is possible to perform an operation of fixing the booklet BT by pressing the booklet BT and a conveying operation appropriate for the sheet thickness, the sheet size, the number of sheets to be stapled, and the kind of the sheets of the booklet BT. Consequently, the possibility of misalignment of the booklet BT is prevented.

4) Using the electrostatic attraction belts or the vacuum belts 310*a* and 312*a* as the first and second conveying belts allows changing the conveying force easily.

5) An operation of driving the booklet BT away from the electrostatic attraction belts or the vacuum belts 310*a* and 312*a* is performed using the belts when the booklet BT is fixed by being pressed, thereby decreasing the conveying force in magnitude. Accordingly, the possibility of misalignment of the booklet BT is prevented.

6) When the booklet BT is to be fixed by being pressed, the conveying force is changed in magnitude from the second magnitude back to the first magnitude. Accordingly, the possibility of misalignment of the booklet BT is prevented.

7) The booklet conveying device includes the upper trimming blade 305 and the lower trimming blade 307 that trim the fore edge portion of the booklet BT in a state where the booklet BT is fixed under a weak resistance force. Accordingly, such a situation that flexure in the booklet BT is straightened after the trimming does not occur, and hence the fore edge portion can be flush finished.

8) The image forming system that includes the image forming apparatus PR, and the first to third sheet postprocessing apparatuses 1, 2, and 3 includes the booklet conveying device according to the present embodiment. Accordingly, it is possible to perform operations from forming the booklet BT by folding sheets on which images are formed in half to trimming the fore edge of the booklet BT as a sequence of operations. Accordingly, by causing the trimmer (the third sheet postprocessing apparatus) 3 that includes the booklet conveying device to trim the fore edge, it becomes possible to obtain the booklet BT having a flush-finished fore edge portion.

The sheet stack in the appended claims is denoted by reference symbol SB; the booklet is denoted by BT; the pair of conveying units correspond to the first and second conveying belts 310 and 312; the leading-end portion of the booklet is denoted by BT2; the positioning unit corresponds to the positioning stopper 317; the pressing unit correspond to the upper unit 300*c*2 and the second conveying belt 312; the conveying-force changing unit corresponds to the CPU 351, the air blower, and the motor; the vacuum belts are denoted by 310*a* and 312*a*; the trimming unit corresponds to the upper trimming blade 305 and the lower trimming blade 307; the image forming system corresponds to the image forming apparatus PR, and the first to third sheet postprocessing apparatuses 1, 2, and 3; the second sheet postprocessing apparatus corresponds to the saddle-stitch booklet-making apparatus; and the third sheet processing apparatus corresponds to the trimmer.

According to an aspect of the embodiment, it is possible to fix a booklet by pressing the booklet without causing a surface sheet to be misaligned.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A booklet conveying device comprising:

a pair of conveying units that convey a booklet made of a stack of folded sheets, and that change a distance therebetween;

a positioning unit that positions the booklet by making a leading-end portion of the booklet abut thereto;

a pressing unit that presses the booklet positioned by the positioning unit onto one of the conveying units in order to fix; and a conveying-force changing unit that changes the conveying force exerted by the conveying units.

2. The booklet conveying device according to claim 1, wherein the conveying-force changing unit, when conveying the booklet, changes conveying force larger than pressing force for pressing to fix.

3. The booklet conveying device according to claim 2, wherein the conveying-force changing unit, when pressing the booklet to fix thereto, changes a conveying force that is after conveying the booklet back to a conveying force that is before the conveying the booklet.

4. The booklet conveying device according to claim 1, wherein the conveying-force changing unit changes the conveying force based on booklet information including information about at least one of a sheet thickness, a sheet size, number of sheets to be stapled, and characteristic of paper.

5. The booklet conveying device according to claim 1, wherein the conveying units includes any one of:

an electrostatic belts that electrostatically pulls the booklet thereto or separates the booklet therefrom; and a vacuum belt that pulls the booklet thereto by vacuum or separate the booklet therefrom by air-blow.

6. The booklet conveying device according to claim 5, wherein the conveying-force changing unit, when pressing the booklet to fix thereto, takes an operation to separate the booklet therefrom.

7. The booklet conveying device according to claim 1, further comprising a trimming unit that trims a fore edge portion of the booklet at a position where the booklet is fixed by the pressure.

8. An image forming system comprising the booklet conveying device according to claim 1.

9. A booklet conveying method for a booklet conveying device comprising:

conveying a booklet made of a stack of folded sheets by a pair of conveying units that change a distance therebetween;

positioning the booklet by making a leading-end portion of the booklet abut thereto by a positioning unit;

pressing the booklet positioned by the positioning unit onto one of the conveying units in order to fix by a pressing unit; and changing, by a conveying-force changing unit, the conveying force exerted by the conveying units during at the conveying and at the pressing.

10. A computer program product comprising a non-transitory computer-usable medium having computer-readable program codes embodied in the medium for a booklet conveying device, the program codes when executed causing a computer to execute:

conveying a booklet made of a stack of folded sheets by a pair of conveying units that change a distance therebetween;

positioning the booklet by making a leading-end portion of the booklet abut thereto by a positioning unit;

pressing the booklet positioned by the positioning unit onto one of the conveying units in order to fix by a pressing unit; and changing, by a conveying-force changing unit, the conveying force exerted by the conveying units during at the conveying and at the pressing.

* * * * *